(12) United States Patent
Abe et al.

(10) Patent No.: US 7,978,413 B2
(45) Date of Patent: Jul. 12, 2011

(54) MICRO-LENS ARRAY SUBSTRATE AND METHOD FOR MANUFACTURING THEREOF

(75) Inventors: Moriaki Abe, Miyagi (JP); Hiroyuki Minami, Miyagi (JP); Kenichi Satoh, Miyagi (JP); Kazuhiro Shinoda, Miyagi (JP); Junichi Mizuma, Miyagi (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 12/432,803

(22) Filed: Apr. 30, 2009

(65) Prior Publication Data

US 2009/0212011 A1 Aug. 27, 2009

Related U.S. Application Data

(63) Continuation of application No. 10/557,803, filed as application No. PCT/JP2005/006446 on Mar. 25, 2005, now Pat. No. 7,715,104.

(30) Foreign Application Priority Data

Mar. 26, 2004 (JP) ................................ 2004-092907
Apr. 1, 2004 (JP) ................................ 2004-109161

(51) Int. Cl.
*G02B 27/10* (2006.01)
(52) U.S. Cl. ........................................ 359/628; 359/619
(58) Field of Classification Search .................. 359/619, 359/620, 628
See application file for complete search history.

(56) References Cited

U.S. PATENT DOCUMENTS

| | | |
|---|---|---|
| 6,330,112 B1 | 12/2001 | Kaise et al. |
| 6,985,297 B2 | 1/2006 | Yamanaka et al. |
| 2004/0008417 A1 | 1/2004 | Shimizu et al. |

FOREIGN PATENT DOCUMENTS

| | | |
|---|---|---|
| JP | 7-191209 | 7/1995 |
| JP | 8-29601 | 2/1996 |
| JP | 09-258195 | 10/1997 |
| JP | 10-301143 | 11/1998 |
| JP | 2000-231007 | 8/2000 |
| JP | 2000-258609 | 9/2000 |
| JP | 2001-42105 | 2/2001 |
| JP | 2003-131012 | 5/2003 |

*Primary Examiner* — Scott J Sugarman
(74) *Attorney, Agent, or Firm* — Oblon, Spivak, McClelland, Maier & Neustadt, L.L.P.

(57) ABSTRACT

A micro-lens substrate having a precise micro-lens array suitable for higher resolution, the micro-lens array substrate of high quality without having a distortion, and a method for manufacturing thereof are provided.

In the micro-lens array substrate of the present invention, a micro-lens array formed of a plurality of consecutive concave lens-shaped micro-lenses is directly formed in a surface of a quartz substrate or glass substrate, and the micro-lens array is formed by a transfer method based on dry-etching. In the micro-lens array substrate of the present invention, a taper portion is formed toward the surface of the substrate in a peripheral portion of the micro-lens array in the quartz substrate or glass substrate.

In a method for manufacturing the micro-lens array substrate of the present invention, a resist layer having a plurality of consecutive lens-shaped concave portions is formed in a surface of a quartz or glass substrate, the lens-shaped concave portion of the resist layer is transferred to the substrate by dry-etching, and a micro-lens array is formed by injecting a resin into the lens-shaped concave portion of this substrate. In addition, a taper portion is formed in a peripheral portion similarly to the formation of the lens-shaped concave portion, and a micro-lens array is formed by injecting a resin into the lens-shaped concave portion and taper portion.

26 Claims, 18 Drawing Sheets

US 7,978,413 B2

MICRO-LENS ARRAY SUBSTRATE AND METHOD FOR MANUFACTURING THEREOF

CROSS-REFERENCE TO RELATED APPLICATIONS

This application is a continuation of pending U.S. application Ser. No. 10/557,803 filed on Nov. 23, 2005, which is herein incorporated by reference, which is the National Stage application of PCT International Application No. PCT/JP2005/06446 filed Mar. 25, 2005, which claims the benefit of priority from Japanese Patent Application Nos. 2004-092907 filed Mar. 26, 2004 and 2004-109161 filed Apr. 1, 2004

TECHNICAL FIELD

The present invention relates to a micro-lens array substrate used for a liquid crystal projector and a method for manufacturing thereof.

BACKGROUND ART

A front AV projector device which has been used for business is gaining ground in a consumer market of a home theater system, for example, with the development of a low-price liquid crystal projector. In the liquid crystal projector, a size thereof has rapidly been reduced and a price thereof has been reduced by improving a degree of integration of components. In addition, a resolution has also been improved with VGA, SVGA, XGA, and SXGA because of the progress of a personal computer, and so a micro-lens array substrate that projects an image of a liquid crystal monitor by efficiently using light from a light source is required also with the improvement in the resolution of the liquid crystal monitor installed in the liquid crystal projector.

In this micro-lens array substrate, a degree of integration of a micro-lens has also been improved in accordance with the improvement in the resolution of the liquid crystal monitor. The micro-lens needs to cope with higher-definition concurrently with higher-brightness; and when a panel size of a liquid crystal display element, for example, becomes small, a pixel size becomes minute proportionally thereto, and therefore an array pitch of the micro-lens itself becomes also small. Accordingly, there is a necessity to make a cover glass thin.

In the past, an application of a wet etching method, a 2P (Photo-Polymerization) method, and the like using a quartz substrate or various glass substrates has been put into practical use for a production of such micro-lens array substrate.

A method for manufacturing a micro-lens array substrate using the wet etching method is shown in FIG. 17. First, a resist mask 32 having a plurality of circular openings 32a correspondingly to the micro-lens array is formed on a substrate 31 made of glass or quartz as shown in FIG. 17A. Next, a plurality of lens-shaped concave portions (spherical concave portions) 33 are formed in a surface of the substrate 31 by isotropic etching through the resist mask 32 using an HF system etchant as shown in FIG. 17B. Next, after the resist mask 32 is removed, the substrate 31 is coated with a resin 34 whose refractive index is different from that of the substrate to fill the concave portion 33 with the resin 34 as shown in FIG. 17C. A micro-lens array 36 in which a plurality of micro-lenses 35 are consecutively arrayed is formed by the resin 34 in the concave portion 33 and the substrate 31. Then, a cover glass plate 37 is bonded on the substrate 31 through the resin 34 and is polished until a required thickness, and further a transparent electrode 38 of ITO (Indium Tin Oxide), for example, is formed on the cover glass plate 37 as shown in FIG. 17D and so a micro-lens array substrate 39 is produced.

A method for manufacturing a micro-lens array substrate using the 2P method is shown in FIG. 18. First, a stamper 41 shown in FIG. 18A is prepared in which a micro-lens array shape 43 having a plurality of micro-lens shapes 42 arrayed is integrally formed. Next, a first resin layer 45 is formed on a glass substrate 44, and the micro-lens array shape 43 of the stamper 41 is pressed onto the resin layer 45 as shown in FIG. 18B. Subsequently, the stamper 41 is detached, and thereby a concave portion 46 of the micro-lens array shape is transferred to a surface of the first resin layer 45 as shown in FIG. 18C. Next, the first resin layer 45 is coated with a second resin 47 whose refractive index is different from that of the first resin to fill the concave portion 46 with the second resin 47 as shown in FIG. 18D. A micro-lens array 49 having a plurality of micro-lenses 48 arrayed is formed by the first resin layer 45 and the second resin 47. Subsequently, a cover glass plate 50 is bonded on the glass substrate 44 through the second resin 47, and the cover glass plate 50 is polished until a required thickness as shown in FIG. 18E. Thereafter, a transparent electrode 51 of ITO (Indium Tin Oxide), for example, is formed on the cover glass plate 50 to produce a micro-lens array substrate 52.

A method for manufacturing the micro-lens array substrate using the above-described wet etching method is described in the patent reference 1. In addition, a method for manufacturing the micro-lens array substrate using the 2P method is described in the patent reference 2.

[Patent reference 1] Japanese Published Patent Application No. 2000-231007
[Patent reference 2] Japanese Published Patent Application No. H09-258195

The method for manufacturing the micro-lens array substrate using the above-described 2P method is excellent in mass productivity since the lens shape is transferred to the resin layer 45 by using the stamper 41 in the method. However, it is difficult to control a pattern size of the micro-lens array due to a thermal shrinkage of the resin layer 45 at the time of hardening. In addition, since the concave portion 46 is formed in the resin layer 45, an acute angle cannot be maintained but tends to become round in a boundary portion of the adjacent concave portions 46, that is, at a vertex portion 53 (refer to FIG. 18D), and as a result, the boundary portion becomes a non-lens area. Particularly, when the micro-lens itself is made minute in order to obtain higher resolution, a ratio of this non-lens area increases and it becomes difficult to form the micro-lens array. Also, there have been limits in thermostability and light stability since two kinds of resins are used.

In the method for manufacturing the micro-lens array substrate using the wet etching method, the shape of a micro-lens only becomes spherical since this method is the isotropic etching, and it is not possible to form a micro-lens of other aspheric shapes. That is, there is no controllability upon the lens shape.

On the other hand, in the past, there has been a limit of 30 μm for a cover surface layer thickness that is a thickness from the vertex portion of the concave-shaped lens of the resin layer to the surface layer of the cover glass plate, and it has not been possible to form the thickness thinner than this. A reason therefor is that the resin layer cannot be formed thin due to an influence of a viscosity of resin when forming the resin layer (in actuality, a resin whose viscosity is higher than 100 cp was used).

Further, when the micro-lens array 36 is formed in the above-described quartz substrate or glass substrate, and when this micro-lens array substrate 31 is filled with the resin 34 to be hardened after the cover glass 37 is bonded, an air bubble 30 is generated at a peripheral portion of the micro-lens array 36 formed as shown in FIG. 19. The air bubble 30 is generated due to an occurrence of a distortion by the shrinkage of the resin in the area of micro-lens array 36 and in the peripheral portion, and also due to an occurrence of an abrupt change in the resin thickness. In the case of the micro-lens array substrate using the 2P method, an air bubble is similarly generated between the first resin layer and the second resin layer in a peripheral portion of the micro-lens array area. Even though no air bubble is generated, there is an occasion that a glitter appears on a screen due to the distortion as if the air bubble is generated.

DISCLOSURE OF THE INVENTION

The present invention is to provide a micro-lens substrate which is suitable for higher resolution and which has a precise micro-lens array, and a method for manufacturing the micro-lens array substrate, which enables such micro-lens array substrate to be manufactured at a high yield rate.

Further, the present invention is to provide a micro-lens array substrate in which an air bubble is not generated and a distortion is reduced at the time of filling and hardening a resin, and a method for manufacturing thereof.

A micro-lens array substrate according to the present invention includes a micro-lens array which has a plurality of consecutive concave lens-shaped micro-lenses directly formed in a surface of a quartz substrate or glass substrate, wherein the micro-lens array is formed by a transfer method based on dry-etching.

A micro-lens array substrate according to the present invention has a plurality of consecutive lens-shaped concave portions formed in a surface of a quartz substrate or glass substrate, which is filled with a resin to form a micro-lens array, wherein a portion corresponding to a peripheral portion of the micro-lens array of the quartz substrate or glass substrate is formed in a tapered shape toward the surface of the substrate.

A method for manufacturing a micro-lens array substrate according to the present invention includes the processes of: forming a resist layer having a plurality of consecutive lens-shaped concave portions in a surface of a quartz substrate or glass substrate, dry-etching the resist layer to transfer the lens-shaped concave portion to the surface of the quartz substrate or glass substrate, and forming a micro-lens array by injecting a resin whose refractive index is different from that of the quartz substrate or glass substrate into the lens-shaped concave portion in the surface of the quartz substrate or glass substrate.

A method for manufacturing a micro-lens array substrate according to the present invention includes the processes of: forming in a surface of a quartz substrate or glass substrate a plurality of consecutive lens-shaped concave portions and a taper portion inclined toward a surface of a substrate from a peripheral lens-shaped concave portion, and forming a micro-lens array having a taper portion in a peripheral portion by injecting a resin whose refractive index is different from that of the quartz substrate or glass substrate into the lens-shaped concave portion and taper portion in the surface of the quartz substrate or glass substrate.

According to the micro-lens array substrate of the present invention, since the micro-lens array having the plurality of consecutive concave lens shapes is directly formed in the surface of the quartz substrate or glass substrate by the transfer method based on the dry-etching, a micro-lens array substrate that has a precise micro-lens array whose pattern size is accurate can be provided. Since this micro-lens array is formed by filling the lens-shaped concave portion formed in the surface of the quartz substrate or glass substrate with the resin layer of the different refractive index, a material to be used can be reduced and a structure can be simplified.

According to the micro-lens array substrate of the present invention, since the taper portion is provided toward the surface of the substrate in the peripheral portion of the micro-lens array on the micro-lens array substrate, an excellent micro-lens array substrate can be formed without generating an air bubble and distortion by reducing the shrinkage of the micro-lens array and peripheral portion when the cover glass is bonded and the resin is hardened after the resin is filled. Since the air bubble is not generated, it is possible to use a micro-lens in the outermost circumference of the micro-lens array.

According to the method for manufacturing the micro-lens array substrate of the present invention, the micro-lens array is formed by transferring the lens-shaped concave portion of the resist layer to the surface of the quartz substrate or glass substrate using the dry etching and by injecting the resin layer of the different refractive index into the lens-shaped concave portion of the quartz substrate or glass substrate. Since the quartz substrate or glass substrate does not cause a change in size during a process, a micro-lens array whose pattern size is accurate can be formed.

Since only one kind of resin layer is used as the resin layer, the thermostability and light stability are excellent. Since the micro-lens array is formed by injecting the resin layer into the lens-shaped concave portion of the quartz substrate, the material to be used is less, the number of processes is reduced, and so a micro-lens array substrate whose structure is simple can be manufactured.

According to the method for manufacturing the micro-lens array substrate of the present invention, since the taper portion having the inclination toward the surface of the substrate from the peripheral lens-shaped concave portion is also formed in the surface of the quartz substrate or glass substrate and the micro-lens array is formed by injecting the resin of the different refractive index into the lens-shaped concave portion and taper portion, the shrinkage of the resin is reduced in the micro-lens array area and peripheral portion, and the micro-lens array substrate can be manufactured without generating the air bubble and distortion.

BEST MODE FOR CARRYING OUT THE INVENTION

Figure 1A:
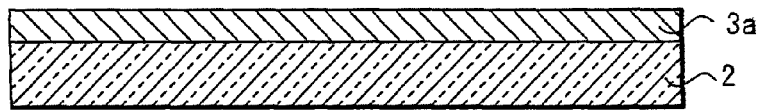
FIGS. 1A through 1E are (first) process diagrams showing a first embodiment of a method for manufacturing a micro-lens substrate according to the present invention.

A micro-lens array substrate according to an embodiment of the present invention includes a micro-lens array in which a micro-lens array having a plurality of consecutive concave lens-shaped micro-lenses is directly formed in a surface of a quartz substrate or glass substrate and the micro-lens array is formed by a transfer method based on dry-etching.

As a preferable form of this micro-lens array substrate, a micro-lens is formed by filling a lens-shaped concave portion formed in the surface of the quartz substrate or glass substrate with a resin layer whose refractive index is different from that of the quartz substrate or glass substrate. For example, the lens-shaped concave portion is filled with a resin whose refractive index is larger than that of the quartz substrate or glass substrate, and so light incident from the glass substrate side is refracted in a boundary portion between the glass substrate and the resin layer to make the portion have a function as a focusing lens. It is preferable that a portion corresponding to a peripheral portion of the micro-lens array of the quartz substrate or glass substrate is formed in a tapered shape toward the surface of the substrate.

It is preferable that the micro-lens array is formed in a state without having a non-lens area in a boundary portion of adjacent micro-lenses. A micro-lens can be formed in a spherical shape or aspherical shape by using the multiple exposure method. It is preferable that an alignment mark is provided outside the micro-lens array area in the surface of the quartz substrate or glass substrate. A cover glass member having a required thickness is bonded on the side of the surface in which the micro-lens array is formed. It is preferable that a cover surface layer thickness from a vertex of the micro-lens to a surface of the cover glass is 30 μm or less, and also a thickness of the resin layer is 10 μm or less. It is preferable that a light-shielding layer is formed in the surface of the cover glass member at a position corresponding to the boundary portion of the adjacent micro-lenses. Further, it is preferable that a transparent protective layer is formed to cover the light-shielding layer on the surface of the cover glass member.

A micro-lens array substrate according to another embodiment of the present invention is formed such that a plurality of consecutive lens-shaped concave portions are formed in a surface of a quartz substrate or glass substrate, a micro-lens is formed in which the lens-shaped concave portion is filled with a resin, and a portion corresponding to a peripheral portion of a micro-lens array of the quartz substrate or glass substrate is formed in a tapered shape toward the surface of the substrate.

As a preferable form of this micro-lens array substrate, a cover glass member is bonded on the surface of the quartz substrate or glass substrate with the resin in between. The taper in the peripheral portion of the micro-lens array can be formed in a stepped shape. The taper can be formed to have a convex-shaped curve on the lower side. The taper can be formed to have a convex-shaped curve on the upper side. The taper can be formed by using the multiple exposure.

A method for manufacturing a micro-lens array substrate according to an embodiment of the present invention includes the processes of: forming a resist layer having a plurality of consecutive lens-shaped concave portions in a surface of a quartz substrate or glass substrate, dry-etching the resist layer to transfer the lens-shaped concave portion to the surface of the quartz substrate or glass substrate, and forming a micro-lens array by injecting a resin whose refractive index is different from that of the quartz substrate or glass substrate into the lens-shaped concave portion in the surface of the quartz substrate or glass substrate.

A method for manufacturing a micro-lens array substrate according to another embodiment of the present invention includes the processes of: forming a resist layer having a plurality of consecutive lens-shaped concave portions in a surface of a quartz substrate or glass substrate, dry-etching the resist layer to transfer the lens-shaped concave portion to the surface of the quartz substrate or glass substrate, forming a micro-lens array by injecting a resin whose refractive index is different from that of the quartz substrate or glass substrate into the lens-shaped concave portion in the surface of the quartz substrate or glass substrate and by bonding a cover glass member, and polishing the cover glass member into a required thickness.

A method for manufacturing a micro-lens array substrate according to another embodiment of the present invention includes the processes of: forming in a surface of a quartz substrate or glass substrate a resist layer having a plurality of consecutive lens-shaped concave portions and a taper portion inclined toward a surface of a substrate from a peripheral lens-shaped concave portion, dry-etching the resist layer to transfer the lens-shaped concave portion and taper portion to the surface of the quartz substrate or glass substrate, and forming a micro-lens array by injecting a resin whose refractive index is different from that of the quartz substrate or glass substrate into the lens-shaped concave portion and taper portion in the surface of the quartz substrate or glass substrate.

A method for manufacturing a micro-lens array substrate according to another embodiment of the present invention includes the processes of: forming in a surface of a quartz substrate or glass substrate a resist layer having a plurality of consecutive lens-shaped concave portions and a taper portion inclined toward a surface of a substrate from a peripheral lens-shaped concave portion, dry-etching the resist layer to transfer the lens-shaped concave portion and taper portion to the surface of the quartz substrate or glass substrate, forming a micro-lens array by injecting a resin whose refractive index is different from that of the quartz substrate or glass substrate into the lens-shaped concave portion and taper portion in the surface of the quartz substrate or glass substrate and by bonding a cover glass member, and polishing the cover glass member into a required thickness.

As a preferable mode for each of the above-described methods for manufacturing the micro-lens array substrate, the plurality of consecutive lens-shaped concave portions in the resist layer are formed in a state of being consecutive without having a non-lens area by using the multiple exposure method. A curved surface shape of the plurality of consecutive lens-shaped concave portions in the resist layer is controlled by using the multiple exposure method. Further, in the process of transfer, it is preferable that an alignment mark is simultaneously transferred to the outside of the micro-lens array area in the surface of the quartz substrate or glass substrate.

As a preferable mode of the method for manufacturing the micro-lens array substrate having the above-described cover glass member, the manufacturing method includes a process of forming a light-shielding layer at a position corresponding to a boundary portion of adjacent micro-lenses in the surface of the cover glass member. It is preferable that a process of forming a transparent protective layer to cover the light-shielding layer is included. It is preferable that a film thickness of the resin from a vertex of the micro-lens to the cover glass member is made into 10 μm or less, and also the cover glass member is polished such that a cover surface layer thickness from the vertex of the micro-lens to the surface of the cover glass member becomes 30 μm or less.

A method for manufacturing a micro-lens array substrate according to further another embodiment of the present invention includes the processes of: forming in a surface of a quartz substrate or glass substrate a plurality of consecutive lens-shaped concave portions and a taper portion inclined toward a surface of a substrate from a peripheral lens-shaped concave portion, and forming a micro-lens array having the taper portion at a peripheral portion by injecting a resin whose refractive index is different from that of the quartz substrate or glass substrate into the lens-shaped concave portion and taper portion in the surface of the quartz substrate or glass substrate.

A method for manufacturing a micro-lens array substrate according to still another embodiment of the present invention includes the processes of: forming in a surface of a quartz substrate or glass substrate a plurality of consecutive lens-shaped concave portions and a taper portion inclined toward a surface of a substrate from a peripheral lens-shaped concave portion, forming a micro-lens array having the taper portion in a peripheral portion by injecting a resin whose refractive index is different from that of the quartz substrate or glass substrate into the lens-shaped concave portion and taper portion in the surface of the quartz substrate or glass substrate and by bonding a cover glass member, and polishing the cover glass member into a required thickness.

In those methods for manufacturing the micro-lens array substrates, the above-described preferable mode can be applied. Specifically, the plurality of consecutive lens-shaped concave portions in the resist layer are formed in a state of being consecutive without having a non-lens area by using the multiple exposure method. The curved surface shape of the plurality of consecutive lens-shaped concave portions in the resist layer is controlled by using the multiple exposure method. Further, in the process of the transfer, it is preferable that an alignment mark is simultaneously transferred to the outside of the micro-lens array area in the surface of the quartz substrate or glass substrate.

As a preferable mode of the method for manufacturing the micro-lens array substrate having the above-described cover glass member, the manufacturing method has a process of forming a light-shielding layer at a position corresponding to a boundary portion of adjacent micro-lenses in the surface of the cover glass member. It is preferable that a process of forming a transparent protective layer to cover the light-shielding layer is included. It is preferable that a film thickness of the resin from a vertex of the micro-lens to the cover glass member is made into 10 μm or less, and also the cover glass member is polished such that a cover surface layer thickness from the vertex of the micro-lens to the surface of the cover glass member becomes 30 μm or less.

According to the micro-lens array substrate according to the embodiment of the present invention, since the micro-lens array having the plurality of consecutive concave lens-shaped micro-lenses is formed directly in the surface of the quartz substrate or glass substrate by the transfer method based on the dry-etching, a micro-lens array substrate having a precise micro-lens array whose pattern size is accurate can be provided. Since this micro-lens array is formed by filling the lens-shaped concave portion formed in the surface of the quartz substrate or glass substrate with the resin layer of the different refractive index, the material to be used can be reduced and the structure can be simplified.

Since the portion corresponding to the peripheral portion of the micro-lens array in the quartz substrate or glass substrate is formed in the tapered shape toward the surface of the substrate, the shrinkage of the micro-lens array and peripheral portion is reduced, and an air bubble and distortion can be prevented from generating when the cover glass is bonded and the resin is hardened after filling the resin. Since the air bubble is not generated, a micro-lens array in the outermost circumference of the micro-lens array can also be used.

In addition, since the micro-lens array is formed in the state without having non-lens area in the boundary portion between the adjacent micro-lenses and the boundary portion is also formed as the lens area, the micro-lens array substrate has an excellent light focusing efficiency. Since the micro-lens array is formed by using the multiple exposure method, a spherical shape or aspherical shape as a lens curved surface can be obtained, and a micro-lens array substrate having a lens curved surface fitting the purpose can be provided.

Since the alignment mark is provided outside the micro-lens array area in the surface of the quartz substrate or glass substrate, the alignment mark having positional accuracy can be obtained and positional alignment in a post-process can accurately be performed. Further, since there is no need to form the alignment mark in a separate process, a manufacturing process can be simplified.

Since the cover glass plate having the required thickness is formed on the side of the surface where the micro-lens array is formed, a formation of a transparent electrode and light distribution film is favorably made when the micro-lens array substrate is used for a liquid crystal panel, for example. A black matrix can be formed at the closest position to the micro-lens by forming the black matrix at a position corresponding to a boundary portion of adjacent micro-lenses 11 in the surface of this cover glass plate. When this micro-lens array substrate constitutes a liquid crystal panel, for example, light is irradiated on an acute vertex of the boundary portion between the adjacent micro-lenses since such black matrix is included, and even if stray light component is generated, the stray light component can securely be prevented from being incident on a TFT circuit side by the black matrix.

Even when the micro-lens is made minute in accordance with the higher resolution, light can be focused on an objective area by making thin the cover surface layer thickness from the vertex of the micro-lens to the surface of the cover glass into 30 μm or less and also the thickness of the resin layer into 10 μm or less. Specifically, a lens focal depth of the minute micro-lens can be adjusted to the objective area.

Since the transparent protective layer is formed to cover the light-shielding layer on the surface of the cover glass member, the light-shielding layer can be prevented from oxidizing even if the light-shielding layer is formed with a member easy to oxidize such as Al, for example. In addition, since the transparent protective layer acts as an anti-reflective film, an optical transmittance can be improved.

According to the method for manufacturing the micro-lens array substrate of the embodiment of the present invention, the micro-lens array is formed by transferring the lens-shaped concave portion in the resist layer to the surface of the quartz substrate or glass substrate using dry-etching, and by injecting the resin layer of the different refractive index into the lens-shaped concave portion in the quartz substrate or glass substrate. Since a dimensional change is not caused in the quartz substrate or glass substrate during the process, a micro-lens array whose pattern size is accurate can be formed.

Since only one kind of resin layer is used as the resin layer, the thermostability and light stability are excellent. Since the micro-lens array is formed by injecting the resin layer into the lens-shaped concave portion in the quartz substrate, the material to be used is reduced, the number of processes is also decreased, and a micro-lens array substrate of a simple structure can be manufactured.

In addition, since the lens-shaped concave portion in the resist layer is formed in the state of being consecutive without having a non-lens area by using the multiple exposure method, the lens boundary portion of the lens-shaped concave portion after being transferred to the quartz substrate or glass substrate can be formed as the lens area. Accordingly, a micro-lens array having a favorable light focusing efficiency can be formed.

The curved surface shape of the lens-shaped concave portion can be controlled arbitrarily by forming the lens-shaped concave portion in the resist layer using the multiple exposure method. Specifically, the lens of the micro-lens array can be formed by freely designing the curved surface and depth thereof. For example, each lens of the micro-lens array can be formed in an arbitrary curved surface such as a spherical shape or aspherical shape.

The alignment mark having a high position accuracy can be formed by forming the alignment mark outside the micro-lens array area simultaneously in the process of transferring the lens-shaped concave portion to the surface of the quartz substrate or glass substrate, and subsequent mask matching in a stepper apparatus can be performed accurately.

According to the method for manufacturing the micro-lens array substrate according to another embodiment of the present invention, the lens-shaped concave portion in the resist layer is transferred to the surface of the quartz substrate or glass substrate by the dry-etching, the micro-lens array is formed by injecting the resin layer of the different refractive index into the lens-shaped concave portion in the quartz substrate or glass substrate and by bonding the cover glass member, and after that the cover glass member is polished into the required thickness. In this manufacturing method, a similar effectiveness to the above-described manufacturing methods can be obtained such as the micro-lens array having the high pattern size accuracy being formed. Further, the subsequent formation of the black matrix is made possible by including the processes of bonding the cover glass member and of polishing this cover glass member into the required thickness.

The light-shielding layer can be formed at the closest position to the micro-lens array by forming the light-shielding layer at the position corresponding to the boundary portion of the adjacent micro-lenses in the surface of the cover glass member. Accordingly, when this micro-lens array substrate constitutes a liquid crystal panel, for example, light is irradiated on the acute vertex of the boundary portion between the adjacent micro-lenses, and even if stray light component is generated, the stray light component is securely prevented from being incident on the TFT circuit side by this light-shielding layer.

Further, the light-shielding layer can precisely be formed at the position of the boundary portion between the adjacent micro-lenses by forming the above-described alignment mark having the high positional accuracy in the surface of the quartz substrate or glass substrate. Also, a process of forming the alignment mark is not required separately, and the process can be simplified.

Since the process of forming the transparent protective layer to cover the light-shielding layer is included, even if the light-shielding layer is formed of a material such as Al that is easily oxidized, the light-shielding layer, specifically the black matrix, is not oxidized over a long period of time and stray light can be shielded. When the light-shielding layer is oxidized, a pinhole is easily generated in the light-shielding layer, and the reliability as the light-shielding layer decreases. In addition, an opposing electrode and the like can be formed without paying attention to an oxygen atmosphere in the process thereafter.

Furthermore, since the transparent protective layer acts as an anti-reflective film, a micro-lens array substrate that has higher optical transparency can be manufactured.

By making the thickness of the above-described resin layer into 10 μm or less and also by polishing the cover glass member such that the cover surface layer thickness from the vertex of the micro-lens to the surface of the above-described cover glass member becomes 30 μm or less, even when a micro-lens is made minute as the resolution becomes higher, a focal depth of the lens can be adjusted to an objective area and a micro-lens array substrate to cope with high resolution can be manufactured.

According to the method for manufacturing the micro-lens substrate of another embodiment of the present invention, by further forming the taper portion having the inclination toward the surface of the substrate from the peripheral lens-shaped concave portion along with the plurality of lens-shaped concave portions in the surface of the quartz substrate or glass substrate in the above-described manufacturing method, the shrinkage of the micro-lens array and peripheral portion at the time of filling and hardening the resin can be reduced, and the micro-lens array substrate can be manufactured without generating an air bubble and distortion. Since the air bubble is not generated, the micro-lens array substrate in which the micro-lens array in the outermost circumference of the micro-lens array is also used can be manufactured.

According to the micro-lens array substrate of another embodiment of the present invention, by providing the taper portion toward the surface of the substrate in the peripheral portion of the micro-lens array on the micro-lens array substrate, the shrinkage of the micro-lens array and peripheral portion is reduced at the time of bonding the cover glass and hardening the resin after filling the resin, and the excellent micro-lens array substrate can be formed without generating an air bubble and distortion. Since the air bubble is not generated, the micro-lens in the outermost circumference of the micro-lens array can also be used.

According to this micro-lens array substrate, since the micro-lens array having the plurality of consecutive concave lens shapes is directly formed in the surface of the quartz substrate or glass substrate, the micro-lens array substrate having the precise micro-lens array whose pattern size is accurate can be provided. Since this micro-lens array is formed by filling the lens-shaped concave portion that is formed in the surface of the quartz substrate or glass substrate with the resin layer of the different refractive index, the material to be used can be reduced and the structure can be simplified.

Further, since the micro-lens array substrate is formed in a state of not having non-lens area in the boundary portion between the adjacent micro-lenses and the boundary portion is also formed as the lens area, the micro-lens array substrate having high light focusing efficiency can be obtained. Since the micro-lens array is formed by using the multiple exposure method, the spherical shape or aspherical shape thereof can be obtained as the lens curved surface, and the micro-lens array substrate having the lens curved surface fitting the purpose can be provided. Since the lens-shaped concave portion is filled with the resin whose refractive index is larger than that of the quartz substrate or glass substrate, light incident from the side of the glass substrate is refracted in the boundary portion between the glass substrate and the resin layer, and a function as a light focusing lens can be obtained.

According to the method for manufacturing the micro-lens array substrate of further another embodiment of the present invention, since the plurality of consecutive lens-shaped concave portions and the taper portion having the inclination toward the surface of the substrate from the peripheral lens-shaped concave portion are formed in the surface of the quartz substrate or glass substrate and since the micro-lens array having the taper portion in the peripheral portion is formed by injecting the resin of the different refractive index, the shrinkage of the micro-lens array and peripheral portion can be reduced at the time of filling and hardening the resin, and the micro-lens array substrate can be manufactured without generating an air bubble and distortion. Since the air bubble is not generated, the micro-lens array substrate in which the micro-lens array in the outermost circumference of the micro-lens array is also used can be manufactured. Further, when the processes is included in which the micro-lens array having the taper in the peripheral portion is formed by injecting the resin and by bonding the cover glass member and thereafter the cover glass member is polished into the required thickness, similar effectiveness to the above-described manufacturing method can be obtained such as enabling the light-shielding layer and alignment mark to be formed in the surface of the cover glass.

Hereinafter, embodiments of the present invention are explained in detail referring to the accompanied drawings.

First Embodiment

A first embodiment of a micro-lens array substrate and a method for manufacturing thereof according to the present invention is shown in FIGS. 1 and 2. In this embodiment, an explanation is made to a micro-lens array substrate for a liquid crystal panel constituting a liquid crystal projector.

First, as shown in FIG. 1A, a quartz substrate or glass substrate of a parallel plate that is a transparent substrate, which is a quartz substrate 2 in this embodiment, is prepared. A photo-resist layer 3a having a required thickness is formed on a surface of this parallel plate of the quartz substrate. In this embodiment, the photo-resist layer 3a is formed by a spin coat method.

Figure 1B:
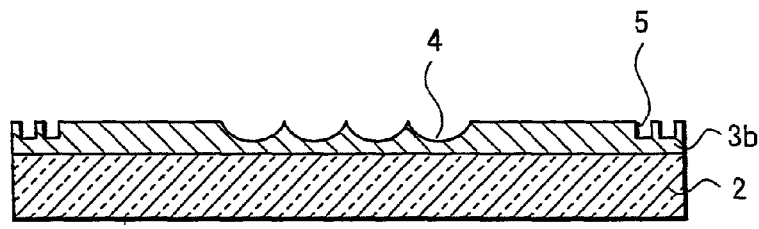
Figure 12:
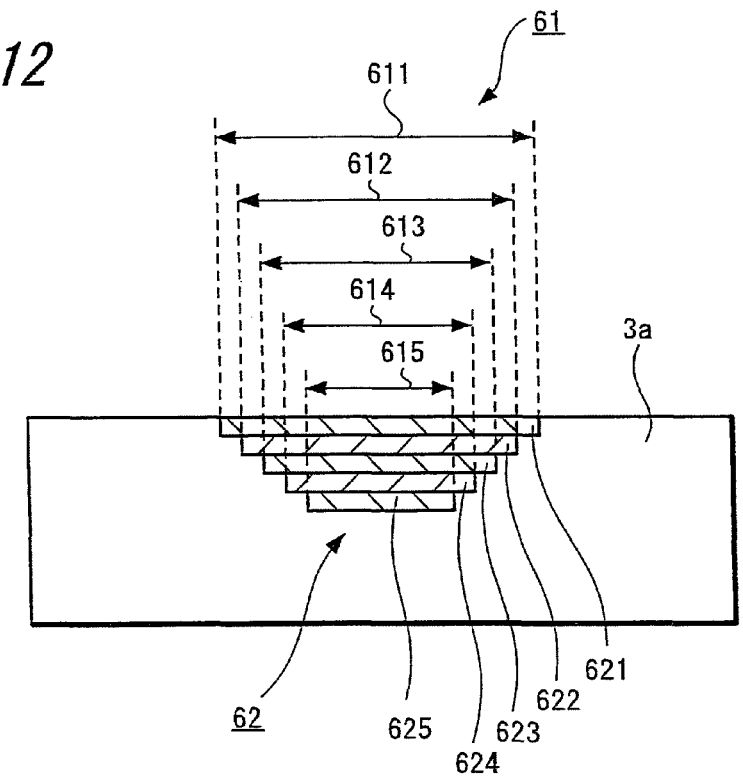
FIG. 12 is an exposure pattern diagram showing an exposure state in a lens-shaped concave portion according to a multiple exposure method.

Next, as shown in FIG. 1B, with performing a photolithography treatment (pattern exposure and development process) on the photo-resist layer 3a, a resist layer 3b having on the surface a concave-shaped curved surface (hereinafter, referred to as a lens-shaped concave portion) 4 of a plurality of consecutive micro-lens shapes that become a prototype of a micro-lens array, and a longitudinal groove pattern 5 corresponding to an alignment mark for stepper that is positioned outside a display area (an area of the lens-shaped concave portion 4 that becomes what is called a micro-lens array) is formed. In this photolithography treatment, the multiple exposure method of performing pattern exposures 62 [621, 622, 623, 624, 625] in sequential order by using a plurality of exposure masks (multiple masks) 61 [611, 612, 613, 614, 615] is used with respect to the photo-resist layer 3a as shown in FIG. 12. An exposure amount increases in the order of the pattern exposures 621 to 625. The multiple exposure can be performed by using an i-line stepper apparatus, for example. A development process is performed after this multiple exposure. A curved surface shape of the lens-shaped concave portion 4 can arbitrarily be controlled by this multiple exposure method, and a lens shape fitting the purpose such as a spherical shape and aspherical shape can be formed, for example.

Figure 1C:
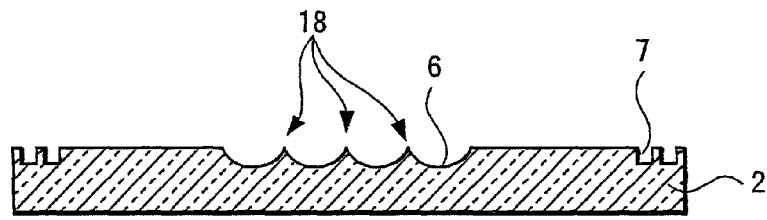

Next, as shown in FIG. 1C, the lens-shaped concave portion 4 and the longitudinal groove pattern 5 that are formed on the side of the surface of the resist layer 3b are transferred to the surface of the quartz substrate 2 by dry-etching based on anisotropic etching from the upper resist layer 3b. An etching gas with which an etching selection ratio of the resist layer 3b becomes the same as that of the quartz substrate 2 is selected in the dry-etching. For example, a gas such as $CF_4$, $CF_3H$, $CH_2H_2$, $C_3F_8$, and $SF_6$ can be used as the etching gas. A plurality of consecutive lens-shaped concave portions 6 that become the micro-lens array, and a longitudinal groove-shaped alignment mark 7 for stepper that is positioned outside thereof are formed in the surface of the quartz substrate 2 by the dry-etching. In this case, the whole curved surface is formed into a lens shape respectively in each lens-shaped concave portion 6. Therefore, a vertex 18 becomes acute in a boundary portion of the adjacent lens-shaped concave portions 6 such that both curved surfaces are thrust against each other.

Figure 1D:
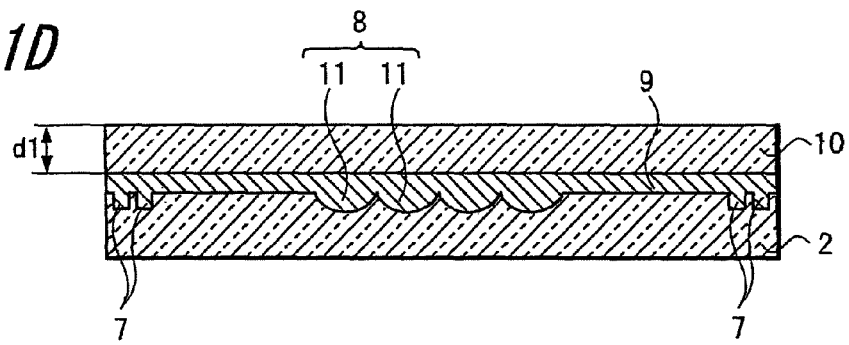

Next, as shown in FIG. 1D, a resin layer 9 whose refractive index is different from that of the quartz substrate 2 is formed in the surface of the quartz substrate 2 such that the lens-shaped concave portion 6 and alignment mark 7 for stepper are filled with the resin layer, and a cover glass plate 10 of a parallel plate having a required thickness d1 is bonded on the resin layer 9 which is planarized. A resin having a larger refractive index than the refractive index of the quartz substrate 2 is used here as the resin layer 9. For example, the refractive index is 1.46 in case of the quartz substrate 2 and is 1.50 in case of the glass substrate. A resin layer whose refractive index is 1.55 or larger and smaller than 1.75, preferably from 1.60 to 1.70, can be used as the resin layer 9. If the refractive index of the resin layer 9 is smaller than 1.55, it is difficult to obtain a necessary focal length when a micro-lens is formed, and therefore it is necessary to make a depth of the lens (corresponding to a thickness) deeper (the thickness is made larger), which is not preferable. Further, when the refractive index of the resin layer 9 becomes 1.75 or larger, a reflection occurs at an interface between the glass substrate or quartz substrate and the resin layer, which is not preferable. In the resin layer 9, a resin which is excellent in light stability and thermostability and which satisfies the above-described refractive index is used as the resin layer 9. An epi-sulfide based resin, other epoxy based, and acrylic based resin can be used, for example. In this embodiment, in the state in which, for example, the thermosetting resin 9 is injected, in other words, dripped on the surface of the quartz substrate 2 and the cover glass plate 10 is placed thereon, the lens-shaped concave portion 6 and alignment mark 7 are filled with the thermosetting resin 9 by spin rotation. Thereafter, the cover glass plate 10 is bonded to the quartz substrate 2 by thermosetting treatment. Subsequently, a micro-lens array 8 in which a plurality of micro-lenses 11 are consecutively arrayed is formed with the quartz substrate 2 and the lens-shaped concave portion 6 filled with the resin layer 9. The consecutive micro-lenses 11 constituting this micro-lens array 8 become consecutive micro-lenses not having a non-lens area in a boundary portion of the adjacent micro-lenses 11. Concurrently, the alignment mark 7 of the longitudinal groove-shaped pattern 5 filled with the resin layer 9 is formed outside the micro-lens array area.

Figure 1E:
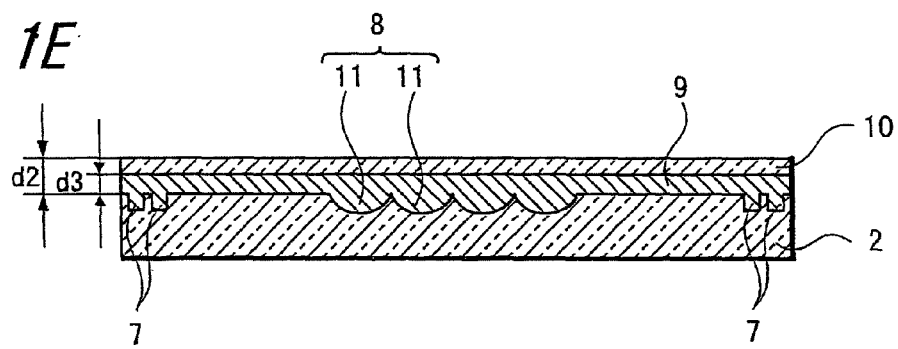

Next, as shown in FIG. 1E, a cover surface layer thickness d2 from a vertex of the concave-shaped micro-lens to the surface of the cover glass is made thin by polishing the cover glass plate 10. The thickness can be made into 5 µm or more and 30 µm or less, preferably less than 20 µm, and more preferably 10 µm or less as this cover surface layer thickness d2. Further, a thickness can be made into 1 µm or more and 10 µm or less as a thickness d3 of the resin layer 9 from the vertex of the micro-lens to the rear surface of the cover glass. A viscosity at this time only needs to be 1 cp or more and 100 cp or less, and a resin having the viscosity of around 30 cp is used in this embodiment.

Here, in case that the cover surface layer thickness d2 exceeds 30 µm, a focal depth of the micro-lens 11 may not be adjusted to an objective position and the light focusing efficiency decreases when the micro-lens 11 is made minute as the resolution becomes higher. With the thickness d2 made thinner to be less than 20 µm, and further 10 µm or less, it becomes possible to make the micro-lens further minute. A manufacturable lower limit of the cover surface layer thickness d2 is 5 µm when the occurrence of dispersion of the thickness d2 in the surface of the substrate is considered. On the other hand, although it is desirable that the thickness d3 of the resin layer 9 is made as thin as possible, the lower limit becomes 1 µm in order to produce a micro-lens in high repeatability. When the thickness d3 exceeds 10 µm, the cover surface layer thickness d2 is influenced, and it is difficult to make the resolution higher when being applied to a liquid crystal panel and the like.

Figure 2A:
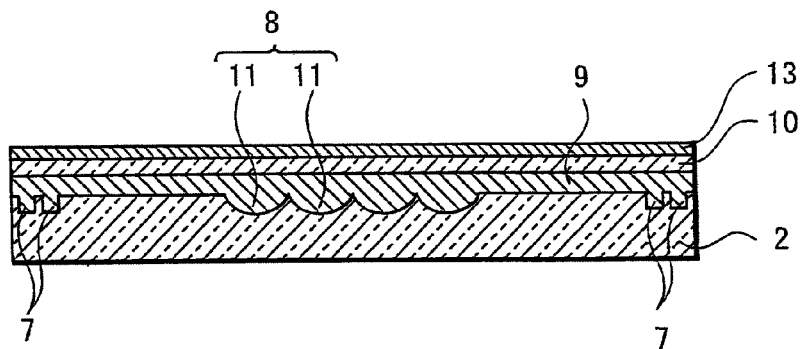
FIGS. 2A through 2D are (second) process diagrams showing the first embodiment of the method for manufacturing the micro-lens substrate according to the present invention.

Next, as shown in FIG. 2A, a light-shielding film made of a metal film and the like that becomes what is called a black matrix, which is an aluminum (Al) film 13 in this embodiment, is formed as a film on the cover glass plate 10 by deposition or spattering and the like.

Figure 2B:
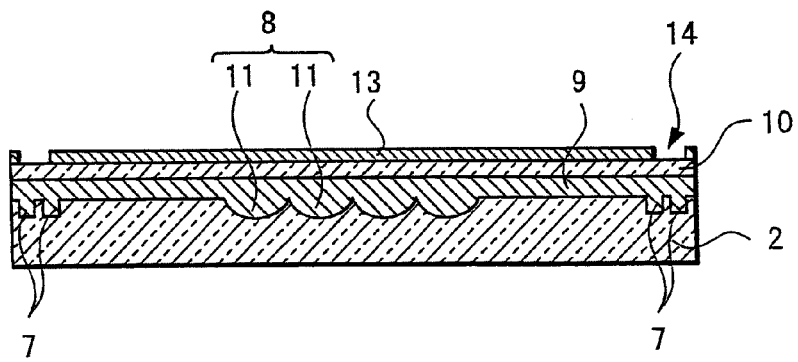

Next, as shown in FIG. 2B, a portion of the aluminum film 13 corresponding to the alignment mark 7 is removed by selective etching such that the alignment mark 7 formed in the quartz substrate 2 can be read, and an opening (what is called a marker window) 14 is formed. The opening 14 can be formed with less accuracy.

Figure 2C:
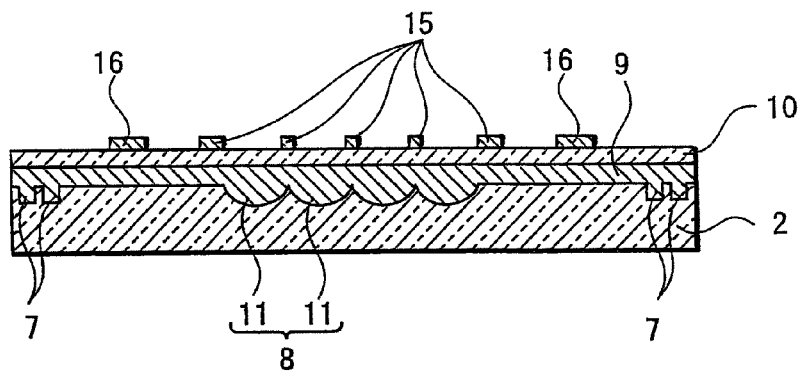
Figure 14:
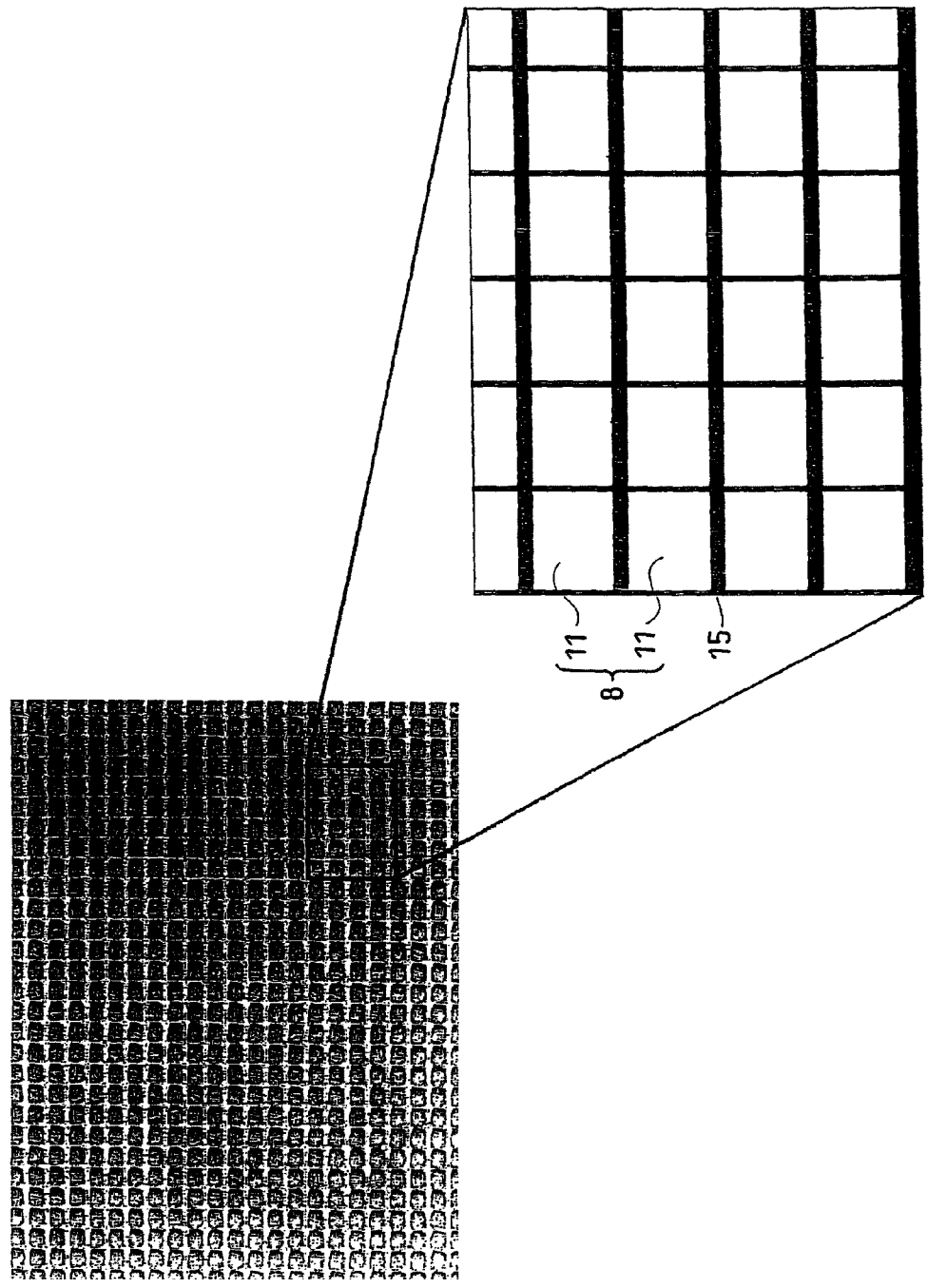
FIG. 14 is an enlarged diagram of an relevant portion of a micro-lens array substrate.

Next, as shown in FIG. 2C, a positional alignment with an exposure mask of an i-line stepper apparatus is performed with the alignment mark 7 as a reference, and the aluminum film 13 is selectively etched to be patterned using a lithography technology to form a black matrix 15. As shown in FIG. 14, this black matrix 15 is formed into a lattice-shaped pattern such that a boundary portion of each consecutive micro-lens 11 remains. In this case, since the alignment mark 7 is formed in the quartz substrate 2 and the position of the alignment mark 7 can be obtained accurately, the black matrix 15 can be formed with alignment accuracy of approximately ±1 µm when the micro-lens 11 is made into an approximate quadrangle shape whose side is 10 µm, for example. An alignment mark made of the aluminum film 13, specifically, an alignment mark 16 described later on for bonding what is called a TFT substrate in which a pixel electrode and thin film transistor (TFT) constituting a liquid crystal panel are formed is formed simultaneously when patterning this black matrix 15.

Figure 2D:
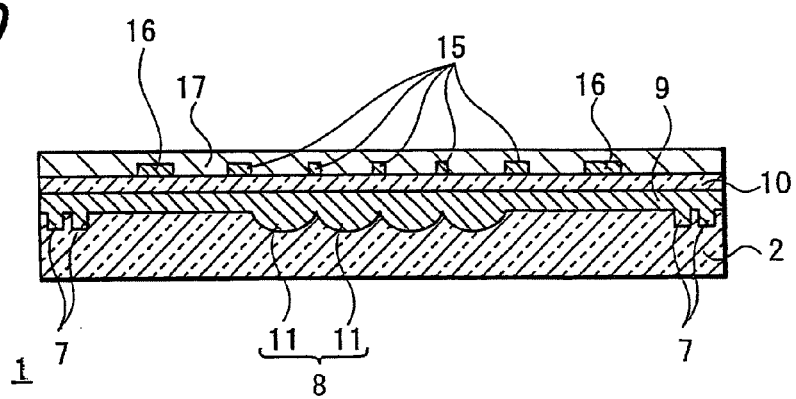

Next, as shown in FIG. 2D, a transparent conductive film, which is an opposing electrode 17 made of an ITO (Indium Tin Oxide) film, for example, is formed on the cover glass plate 10 in which the black matrix 15 and alignment mark 16 are formed, and an objective micro-lens array substrate 1 of a parallel plate can be obtained. It should be noted that a pixel pitch of the micro-lens array substrate 1 in this embodiment is 10 µm×10 µm which is high definition.

According to the micro-lens array substrate 1 of the above-described embodiment, the lens-shaped concave portion 6 is directly formed in the surface of the quartz substrate 2 by the transfer method based on the dry-etching, and the micro-lens array 8 having the plurality of consecutively arrayed micro-lenses 11 is formed directly in the surface of the quartz substrate 2 by filling this lens-shaped concave portion with the resin. Since the micro-lens array 8 is directly formed in the surface of the quartz substrate in this structure, the micro-lens array substrate 1 having the precise micro-lens array 8 whose pattern size is accurate can be provided.

Further, the boundary portion between the adjacent micro-lenses 11 is formed in a state where there is no non-lens area. Specifically, since the lens-shaped concave portion 6 is formed in the quartz substrate 2, the boundary portion is formed as an acute vertex 18 without becoming blunt, and the boundary portion is also formed as the lens area. Accordingly, the micro-lens array substrate has a high focusing efficiency.

Since the micro-lens array 8 is formed by using the multiple exposure method, the spherical shape or aspherical shape can be obtained as the lens curved surface thereof, and a micro-lens array substrate whose lens curved surface fits the purpose can be provided.

Since the alignment mark 7 for stepper is integrally provided with the lens-shaped concave portion 6 in the quartz substrate 2, the alignment mark 7 with a positional accuracy can be obtained. In addition, there is no necessity to form the alignment mark in a separate process, and a manufacturing process can be simplified.

Since the cover glass plate 10 having a required thin thickness is formed on the side of the surface where the micro-lens array 8 is formed and the black matrix 15 is formed at the position corresponding to the boundary portion of the adjacent micro-lenses 11 in the surface of this cover glass plate 10, the black matrix 15 is formed at the closest position to the micro-lens 11. With such black matrix 15, when this micro-lens array substrate constitutes a liquid crystal panel, light is irradiated on the acute vertex of the boundary portion between the adjacent micro-lenses 11 and even if the stray light component is generated, a stray light component can securely be prevented by the black matrix 15 from being incident on the TFT circuit side.

With the cover surface layer thickness d2 being made thin into 5 µm or more and 30 µm or less and further the resin thickness d3 being made thin into 1 µm or more and 5 µm or less, light can be focused on an objective area even when the micro-lens 11 is made minute as the resolution becomes higher. Specifically, the lens focal depth of the minute micro-lens 11 can be adjusted to the objective area. This enables a flexibility of an optical path design to increase.

According to the method for manufacturing the micro-lens array substrate of this embodiment, the lens-shaped concave portion 6 is formed by transferring the lens-shaped concave portion 4 of the resist layer 3b to the surface of the quartz substrate 2 using the dry-etching, and the micro-lens array 8 is formed by filling this lens-shaped concave portion 6 with the resin layer 9. The quartz substrate 2 does not shrink in contrast to the resin layer, and the micro-lens array 8 whose pattern size is accurate can be formed. Further, since the lens-shaped concave portion 6 is transferred directly to the quartz substrate 2, the lens boundary portion between the adjacent micro-lenses 11 can be used as the lens area. Specifically, since a deformation such as becoming blunt is not caused also in the boundary portion of the adjacent micro-lenses in the lens-shaped concave portion 6, the micro-lens array 8 without a non-lens area can be formed. Accordingly, the micro-lens array 8 having high focusing efficiency can be formed.

Since the multiple exposure method is used for the exposure to form the lens-shaped concave portion 4 in the surface of the photo-resist layer 3a, the curved surface shape of the lens-shaped concave portion 4 can be controlled arbitrarily. Specifically, the lens curved surface and lens depth of the micro-lens array 8 can be designed freely and arbitrarily, and so the lens-shaped concave portion 6 of a spherical shape or aspherical shape can be formed to fit the purpose in the surface of the quartz substrate 2. Therefore, this manufacturing method is excellent in controlling the lens shape.

Since the alignment mark 7 for stepper is formed simultaneously when transferring the lens-shaped concave portion 6 to the surface of the quartz substrate 2, the alignment mark 7 having positional accuracy can be formed, and matching of a mask in a stepper apparatus can be performed accurately. Hence, the black matrix 15 can be formed precisely in the portion corresponding to the boundary between the adjacent micro-lenses 11. Further, a process for forming the alignment mark is not required separately, and so the process can be simplified.

Since the cover surface layer thickness d2 is made 5 µm or more and 30 µm or less and further the resin thickness d3 is made 1 µm or more and 10 µm or less to be thin as the cover glass plate 10, the cover glass plate 10 can be made thin in accordance with the focal depth when the micro-lens array 11 is made minute as the resolution becomes higher, and the micro-lens array substrate 1 that copes with the high resolution can be manufactured.

In the micro-lens array substrate 1, the black matrix 15 is integrally formed in the surface of the cover glass plate 10 that is the closest to the micro-lens array 8. Further, the black matrix 15 is formed to correspond to the vertex 18 of the consecutive lens-shaped concave portion 6. Accordingly, when this micro-lens array substrate constitutes a liquid crystal panel, a stray light component can securely be prevented from being incident on the TFT circuit side even if the stray light component is generated from incident light on the acute vertex 18 of the boundary portion between the adjacent micro-lenses 11.

Since only one kind of resin layer 9 is used as the resin layer, the thermo-stability and light stability are excellent. Since the micro-lens array 8 is formed by filling the lens-shaped concave portion 6 of the quartz substrate 2 with the resin layer 9, the material to be used is reduced, the number of processes becomes small, and the micro-lens array substrate 1 having simple structure can be manufactured.

Although the multiple exposure method is applied in the above-described method for manufacturing the micro-lens array substrate of this embodiment, what is called a gray mask method of performing an exposure using a gray mask in which the optical transmittance is changed from a center toward a periphery according to a lens shape in one piece of mask may be performed as the pattern exposure based on the photolithography technology instead of the multiple exposure method.

Second Embodiment

Next, a second embodiment of a micro-lens array substrate and a method for manufacturing thereof according to the present invention is shown in FIGS. 3 and 4. This embodiment is also a case in which the present invention is applied to a micro-lens array substrate used for a liquid crystal panel constituting a liquid crystal projector.

Figure 3A:
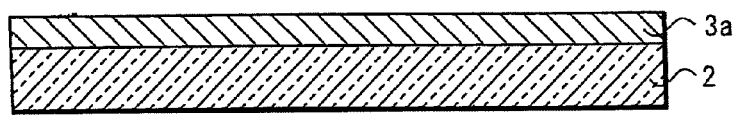
FIGS. 3A through 3D are (first) process diagrams showing a second embodiment of a method for manufacturing a micro-lens substrate according to the present invention.
Figure 3B:
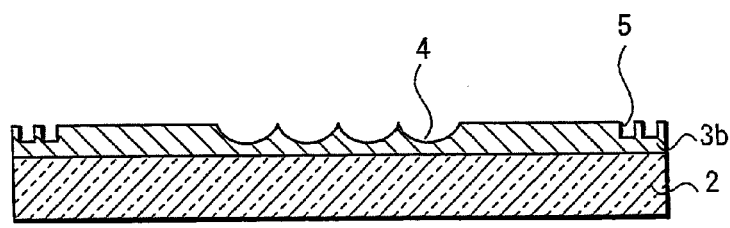
Figure 3C:
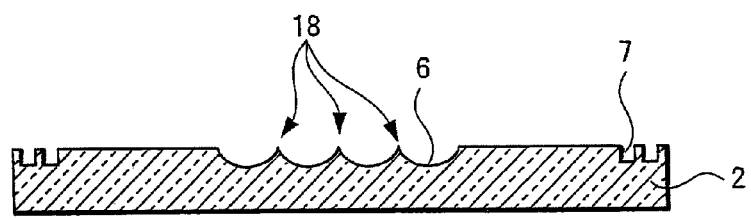

In this embodiment, since processes from FIGS. 3A to 3C are similar to the above-described processes from FIGS. 1A to 1C, a redundant explanation thereof is omitted.

Figure 3D:
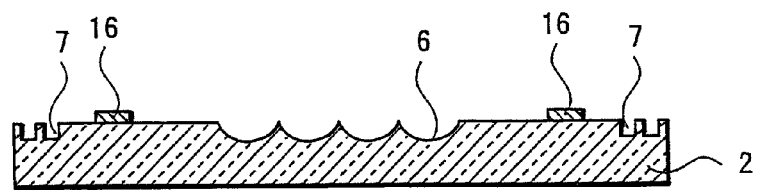

In this embodiment, as shown in FIG. 3D, the alignment mark 16 for bonding a TFT substrate on the surface of the quartz substrate 2 is formed after the process of FIG. 3C. For example, an aluminum film for example is formed on the whole surface of the quartz substrate 2 in the same manner as described above, and an opening is formed by selectively etching and removing the aluminum film at the portion corresponding to the alignment mark 7 for stepper. Subsequently, a positional alignment with an exposure mask of an i-line stepper apparatus is performed with the alignment mark 7 as a reference, and the aluminum film is selectively etched to be patterned using the lithography technology and the alignment mark 16 is formed.

Figure 4A:
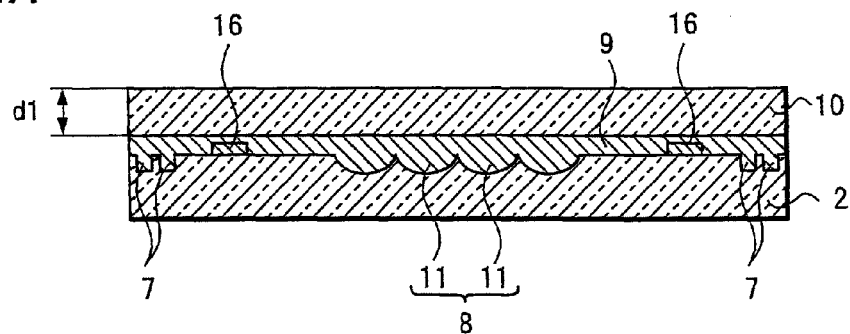
FIGS. 4A through 4C are (second) process diagrams showing the second embodiment of the method for manufacturing the micro-lens substrate according to the present invention.

Next, as shown in FIG. 4A, the resin layer 9 whose refractive index is different from that of the quartz substrate 2 is formed in the surface of the quartz substrate 2 such that the lens-shaped concave portion 6 and alignment mark 7 for stepper is filled with this resin layer, and the cover glass plate 10 of the parallel plate having the required thickness d1 is bonded to the resin layer 9 that is planarized. Similarly to the above described embodiment, a resin having a larger refractive index than the refractive index of the quartz substrate 2 is also used as the resin layer 9. In this embodiment, in a state where the thermosetting resin 9, for example, is dripped on the surface of the quartz substrate 2 and the cover glass plate 10 is placed, the lens-shaped concave portion 6 and alignment mark 7 is filled with the resin 9 by spin rotation. Thereafter, the cover glass plate 10 is bonded to the quartz substrate 2 by thermosetting treatment. The micro-lens array 8 in which the plurality of micro-lenses 11 are arrayed consecutively is formed by the quartz substrate 2 and the lens-shaped concave portion 6 filled with the resin layer 9. The consecutive micro-lenses 11 constituting this micro-lens array 8 become consecutive micro-lenses not having a non-lens area in the boundary portion of the adjacent micro-lenses 11. Concurrently, the alignment mark 7 in which the longitudinal groove-shaped pattern 5 is filled the resin layer 9 is formed outside the micro-lens array area.

Figure 4B:
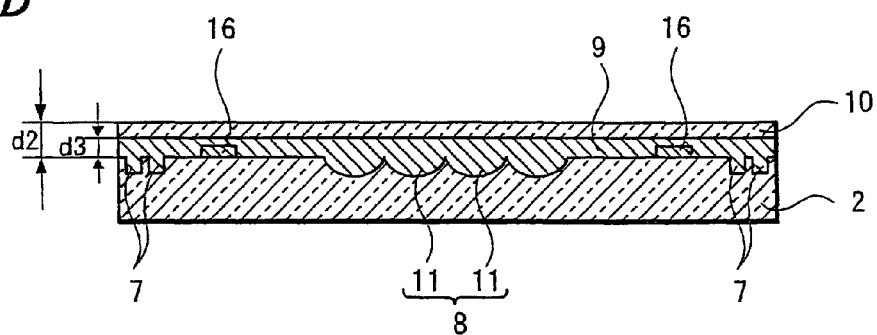

Next, as shown in FIG. 4B, the cover surface layer thickness d2 from the vertex of the micro-lens to the surface of the cover glass is made thin by polishing the cover glass plate 10. Similarly to the above described embodiment, the cover surface layer thickness d2 can be made into 5 μm or more and 30 μm or less, preferably less than 20 μm, and more preferably 10 μm or less. In addition, the thickness d3 of the resin layer 9 can be made into 1 μm or more and 10 μm or less. A resin viscosity only needs to be 1 cp or more and 100 cp or less, and a resin having the viscosity of 30 cp is used in this embodiment.

Figure 4C:
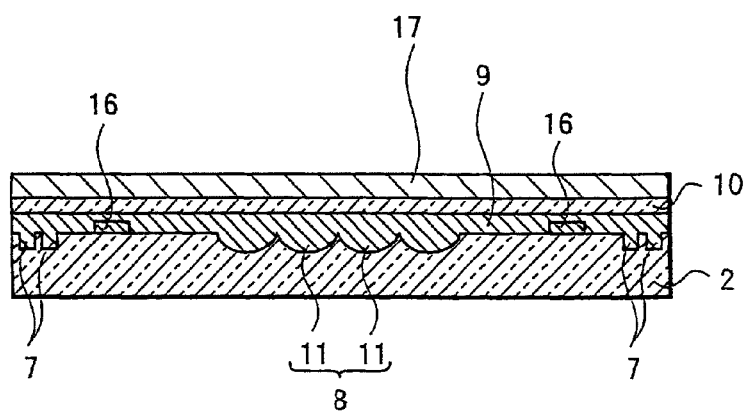

Next, as shown in FIG. 4C, a transparent conductive film that is the opposing electrode 17 made of an ITO (Indium Tin Oxide) film, for example, is formed on the cover glass plate 10 to obtain an objective micro-lens array substrate 71.

In the micro-lens array substrate 71 and method for manufacturing thereof according to this embodiment, other structure and manufacturing method are similar to the above-described micro-lens array substrate 1 than the fact that a black matrix is not formed on the cover glass plate 10. Therefore, effectiveness similar to the above-described micro-lens array substrate 1 except for the effectiveness of the black matrix can be obtained in the micro-lens array substrate 71 and method for manufacturing thereof according to this embodiment.

Third Embodiment

Figure 5:
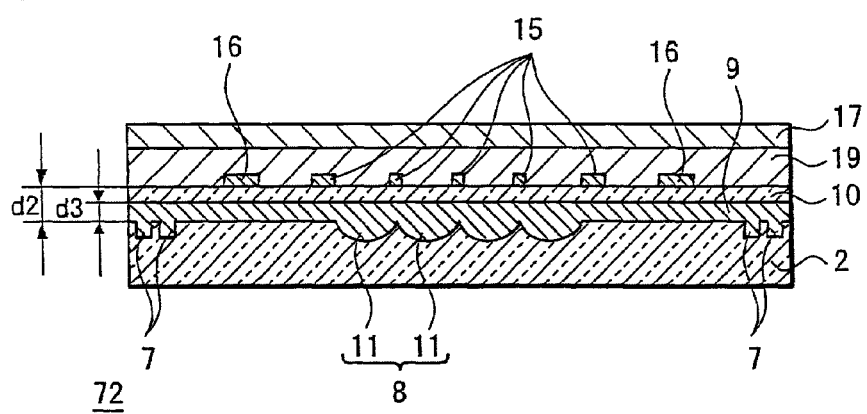
FIG. 5 is a cross-sectional diagram showing a third embodiment of a method for manufacturing a micro-lens substrate according to the present invention.

A third embodiment of a micro-lens array substrate 72 according to the present invention is shown in FIG. 5.

This embodiment is also a case in which the present invention is applied to a micro-lens array substrate used for a liquid crystal panel constituting a liquid crystal projector.

In this embodiment, since the processes are the same as those shown in FIGS. 1A through 2C, a redundant explanation thereof is omitted.

In this embodiment, as shown in FIG. 5, a transparent protective layer that is a silicon oxide film ($SiO_2$ film) 19, for example, is formed after the process of FIG. 2C on the cover glass plate 10 in which the black matrix 15 and alignment mark 16 are formed, and a transparent conductive layer that is the opposing electrode 17 made of the ITO (Indium Tin Oxide) film, for example, is formed as a further upper layer to obtain the objective micro-lens array substrate 72 of a parallel plate.

In the micro-lens array substrate 72 and method for manufacturing thereof according to this embodiment, other structure and manufacturing method are similar to the above-described micro-lens array substrate 1 than the fact that the silicon oxide film 19 is formed on the cover glass plate 10 in which the black matrix 15 and alignment mark 16 are formed. According to this embodiment, since the black matrix 15 and alignment mark 16 formed using Al, for example, are covered with the silicon oxide film 19, the oxidation of Al can be prevented, and the black matrix 15 can be used for a long period of time. Further, since the silicon oxide film 19 that becomes the transparent protective layer acts as a anti-reflective film, the optical transmittance can be increased, and the light focusing efficiency can be improved. In addition, similar effectiveness to the above-described micro-lens array substrate 1 can be obtained also in the micro-lens array substrate 72 and method for manufacturing thereof according to this embodiment.

Fourth Embodiment

A fourth embodiment of a micro-lens array substrate and method for manufacturing thereof according to the present invention is shown in FIGS. 6 and 7. This embodiment is also a case in which the present invention is applied to a micro-lens array substrate used for a liquid crystal panel constituting a liquid crystal projector.

Figure 6A:
FIGS. 6A through 6E are (first) process diagrams showing a fourth embodiment of a method for manufacturing a micro-lens array substrate according to the present invention.

First, as shown in FIG. 6A, a quartz substrate or glass substrate of a parallel plate that is a transparent substrate, which is the quartz substrate 2 in this embodiment, is prepared. The photo-resist layer 3a having a required thickness is formed on the surface of this quartz substrate of the parallel plate. The photo-resist layer 3a is formed by the spin coat method in this embodiment.

Figure 6B:
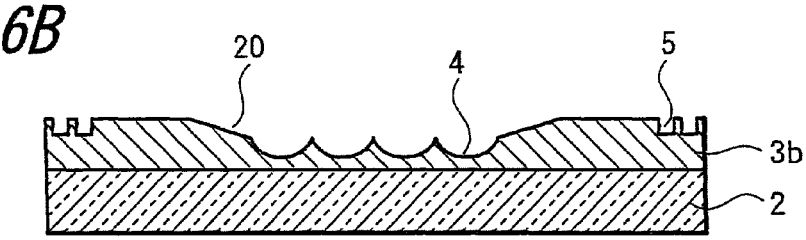
Figure 13:
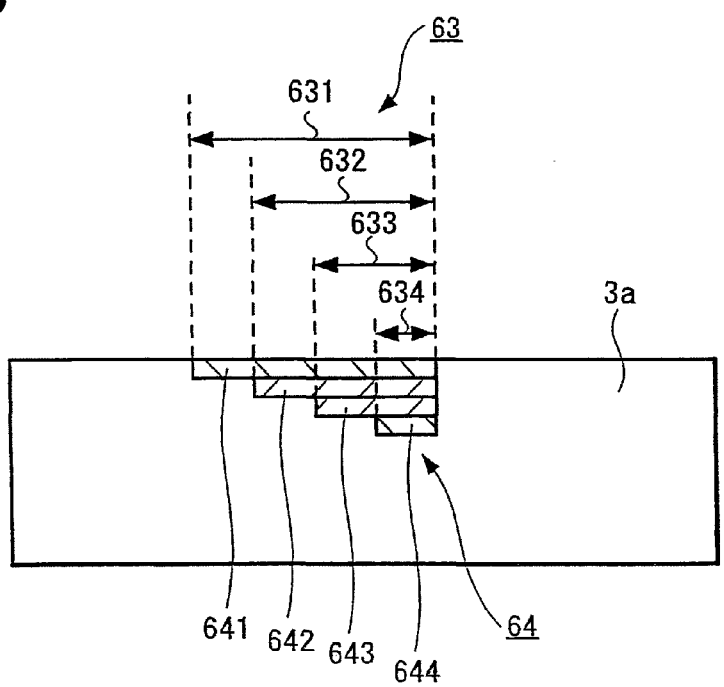
FIG. 13 is an exposure pattern diagram showing an exposure state in a taper portion according to the multiple exposure method.

Next, as shown in FIG. 6B, the resist layer 3b having a concave-shaped curved surface (hereinafter, referred to as a lens-shaped concave portion) 4 of a plurality of consecutive micro-lens shapes that become a prototype of the micro-lens array, a taper-shaped area (hereinafter, referred to as a taper portion) 20 inclined toward a surface of a portion corresponding to a peripheral portion of the micro-lens array, and the longitudinal groove pattern 5 that corresponds to the alignment mark for stepper positioned outside the display area (the area of the lens-shaped concave portion 4 that becomes what is called a micro-lens array), specifically, positioned outside the taper portion 20, are formed on the surface by performing a photolithography treatment (pattern exposure, and development process) to the photo-resist layer 3a. More precisely, the taper portion 20 is formed toward the surface from the lens-shaped concave portion 4 in an outermost circumference of the area of the lens-shaped concave portion 4 that becomes the micro-lens array. The multiple exposure method is used as this photolithography treatment, for example. In the lens-shaped concave portion 4, as shown in FIG. 12, the pattern exposures 62 [621, 622, 623, 624, 625] are performed in sequential order on the photo-resist layer 3a by using a plurality of exposure masks (multiple masks) 61 [611, 612, 613, 614, 615]. As shown in FIG. 13, in the taper portion 20 concurrently with forming the lens-shaped concave portion 4, pattern exposures 64 [641, 642, 643, 644] are performed in sequential order on the photo-resist layer 3a by using a plurality of exposure masks (multiple masks) 63 [631, 632, 633, 634]. In this case, the exposure masks having the same structure are used as the exposure masks 61 for the lens-shaped concave portion 4 and the exposure masks 63 for the taper portion 20. An exposure amount increases in the order of the pattern exposures from 621 to 625, and also in the order of the pattern exposures from 641 to 644. The multiple exposures can be performed by using the i-line stepper apparatus, for example. The development treatment is performed after this multiple exposure. With this multiple exposure method, a curved surface shape of the lens-shaped concave portion 4 and a shape of the taper portion 20 can be controlled arbitrarily, and so a lens shape which fits the purpose such as a spherical shape and aspherical shape, for example, and the taper portion 20 can be formed.

Figure 6C:
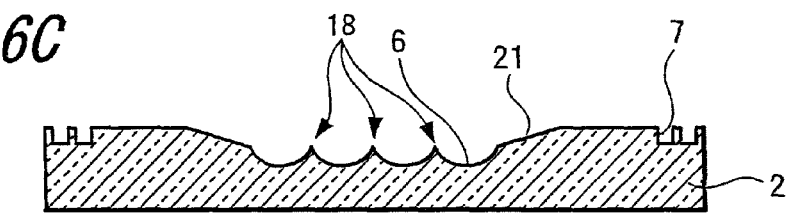

Next, as shown in FIG. 6C, the lens-shaped concave portion 4, the taper portion 20 having the inclination toward the surface of the portion corresponding to the peripheral portion of the micro-lens array, and the longitudinal groove pattern 5, which are formed on the side of the surface of the resist layer 3b are transferred to the surface of the quartz substrate 2 by the dry-etching based on the anisotropic etching from the upper resist layer 3b. An etching gas with which an etching selection ratio of the quartz substrate 2 and the resist layer 3b becomes equal is selected in this dry-etching. For example, a gas such as $CF_4$, $CF_3H$, $CH_2H_2$, $C_3F_8$, and $SF_8$ can be used as the etching gas. By this dry-etching, the plurality of consecutive lens-shaped concave portions 6 that become the micro-lens array, a taper portion 21 inclined toward the surface of the substrate in the portion corresponding to the peripheral portion of the micro-lens array, and the longitudinal groove-shaped alignment mark 7 for stepper that is positioned outside thereof are formed in the surface of the quartz substrate 2 from the lens-shaped concave portion 6 of an outermost circumference. In this case, the whole surface of the curved surface is respectively formed into a lens shape in each lens-shaped concave portion 6. Therefore, the vertex 18 becomes acute in a boundary portion of the adjacent lens-shaped concave portions 6 such that both curved surfaces are thrust against each other.

Figure 6D:
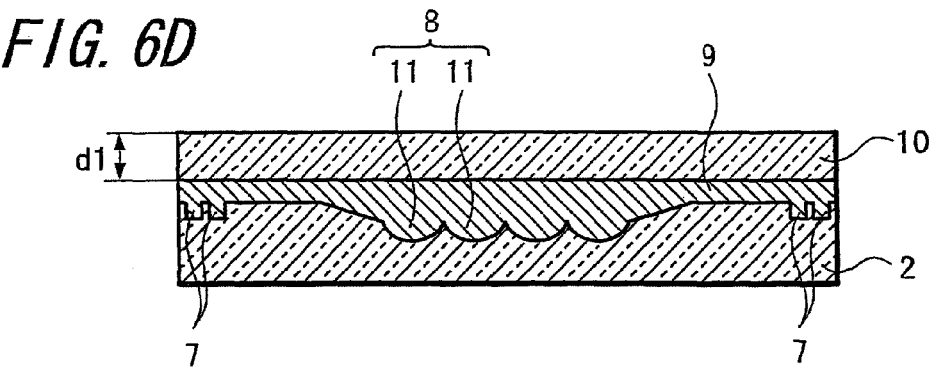

Next, as shown in FIG. 6D, the resin layer 9 whose refractive index is different from that of the quartz substrate 2 is formed on the surface of the quartz substrate 2 such that the lens-shaped concave portion 6 and alignment mark 7 for stepper is filled with this resin layer, and the cover glass plate 10 of the parallel plate having the required thickness d1 is bonded to the resin layer 9 which is planarized. Similarly to the above-described embodiment, a resin having a larger refractive index than the refractive index of the quartz substrate 2 is also used here as the resin layer 9. For example, an epi-sulfide based resin, other epoxy resin and acrylic resin can be used as the resin layer 9. In this embodiment, in a state where the thermosetting resin 9, for example, is injected, in other word, dripped on the surface of the quartz substrate 2 and the cover glass plate 10 is placed thereon, the lens-shaped concave portion 6, taper portion 21, and alignment mark 7 are filled with the resin 9 by performing spin rotation. Thereafter, the cover glass plate 10 is bonded to the quartz substrate 2 by a thermosetting treatment. Since the taper portion is provided to the portion corresponding to the peripheral portion of the micro-lens array of the quartz substrate 2, the resin can be hardened without generating an air bubble in the peripheral portion of the micro-lens array 8 at the time of this thermosetting treatment. The micro-lens array 8 in which the plurality of micro-lenses 11 are arrayed consecutively is formed by the quartz substrate 2 and the lens-shaped concave portion 6 filled with the resin layer 9. The consecutive micro-lenses 11 constituting this micro-lens array 8 become consecutive micro-lenses not having a non-lens area in the boundary portion of the adjacent micro-lenses 11. Concurrently, the alignment mark 7 in which the longitudinal groove-shaped pattern 5 is filled with the resin layer 9 is formed outside the micro-lens array area.

Figure 6E:
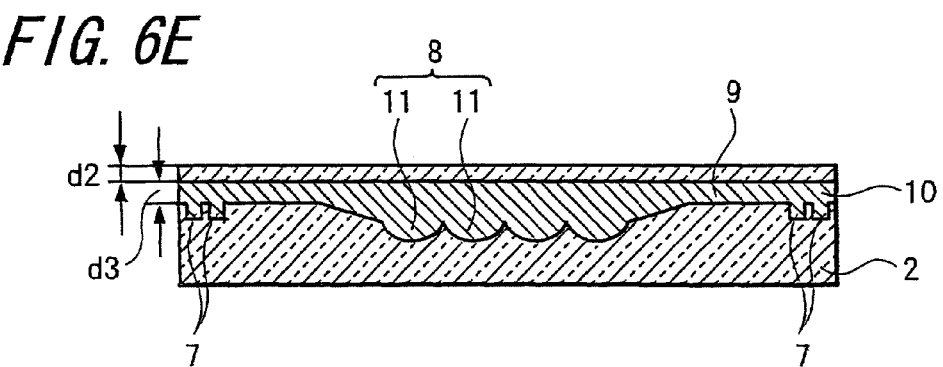

Next, as shown in FIG. 6E, the cover surface layer thickness d2 from the vertex of the concave-shaped micro-lens to the surface of the cover glass is made thin by polishing the cover glass plate 10. Similarly to the above-described embodiment, this cover surface layer thickness d2 can be made into 5 μm or more and 30 μm or less, preferably less than 20 μm, and more preferably 10 μm or less as. In addition, the thickness d3 of the resin layer 9 from the vertex of the micro-lens to the rear surface of the cover glass can be made into 1 μm or more and 10 μm or less. The viscosity of the resin at this time only needs to be 1 cp or more and 100 cp or less, and a resin having the viscosity of approximately 30 cp is used in this embodiment.

Here, in case that the cover surface layer thickness d2 exceeds 30 μm, the focal depth of the micro-lens 11 may not be adjusted to an objective position and the focusing efficiency decreases when the micro-lens 11 is made minute as the resolution becomes higher. As the thickness d2 is made thinner into less than 20 μm, and 10 μm or less, the micro-lens can be made further minute. A manufacturable lower limit of the cover surface layer thickness d2 is 5 μm when the occurrence of dispersion of the thickness d2 in the surface of the substrate is considered. On the other hand, although it is preferable that the thickness d3 of the resin layer 9 is made as thin as possible, a lower limit becomes 1 μm to produce the micro-lens in favorable repeatability. When the thickness d3 exceeds 10 μm, the cover surface layer thickness d2 is influenced, which causes a difficulty in obtaining the higher resolution when being applied to a liquid crystal panel and the like.

Figure 7A:
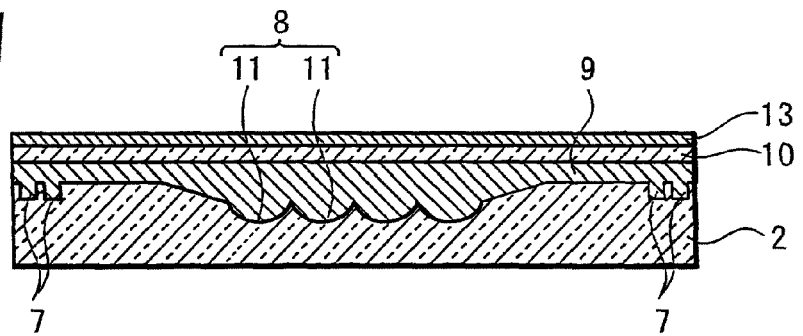
FIGS. 7A through 7D are (second) process diagrams showing the fourth embodiment of the method for manufacturing the micro-lens array substrate according to the present invention.

Next, as shown in FIG. 7A, a light-shielding film made of a metal film and the like that becomes what is called a black matrix, which is the aluminum (Al) film 13 in this embodiment, is formed on the cover glass plate 10 by deposition or spattering and the like.

Figure 7B:
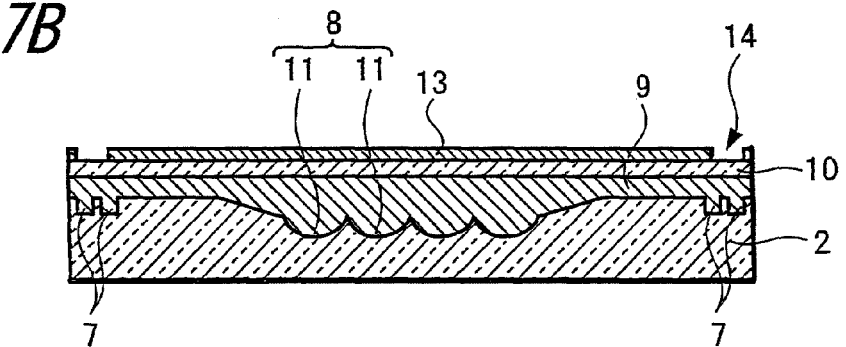

Next, as shown in FIG. 7B, the opening (what is called a marker window) 14 is formed by removing the aluminum film 13 of the portion corresponding to the alignment mark 7 by means of selective etching so that the alignment mark 7 formed in the quartz substrate 2 can be read. The opening 14 can be formed with less accuracy.

Figure 7C:
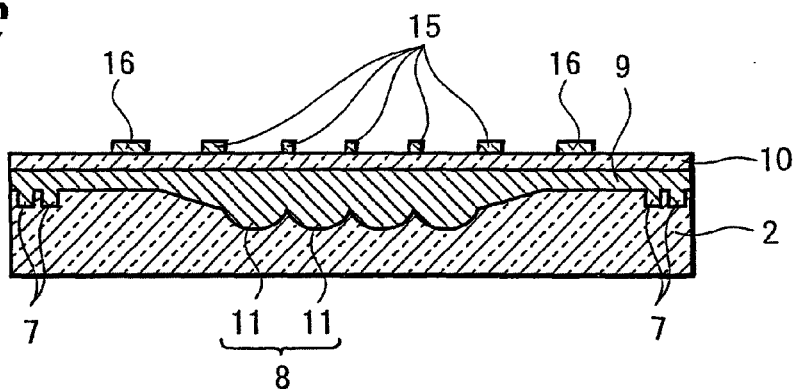

Next, as shown in FIG. 7C, a positional alignment with an exposure mask of an i-line stepper apparatus is performed with the alignment mark 7 as a reference, and the aluminum film 13 is selectively etched to be patterned using the lithography technology and the black matrix 15 is formed. As shown in FIG. 14, the black matrix 15 is formed into the lattice-shaped pattern such that the boundary portion of each consecutive micro-lens 11 remains. In this case, since the alignment mark 7 is formed in the quartz substrate and the position of the alignment mark 7 is obtained with high accuracy, the black matrix 15 can be formed with alignment accuracy of approximately ±1 μm when the micro-lens 11 is made into an approximate quadrangle shape whose one side is 10 μm, for example. Concurrently with the patterning of the black matrix 15, an alignment mark made of the aluminum film 13, specifically, the later-described alignment mark 16 for bonding what is called a TFT substrate in which a pixel electrode and thin film transistor (TFT) constituting a liquid crystal panel are formed, is formed.

Figure 7D:
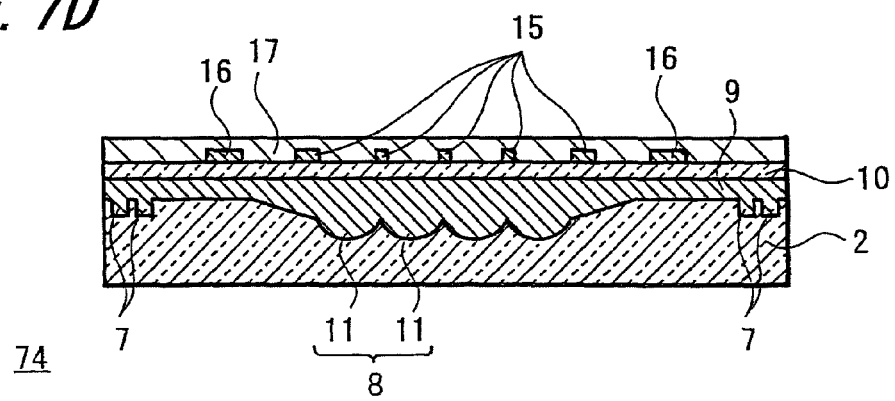

Next, as shown in FIG. 7D, a transparent conductive film, which is the opposing electrode 17 made of the ITO (Indium Tin Oxide) film, for example, is formed on the cover glass plate 10 in which the black matrix 15 and alignment mark 16 are formed, and an objective micro-lens array substrate 74 of a parallel plate is obtained. It should be noted that a pixel pitch of the micro-lens array substrate 1 in this embodiment is 10 μm×10 μm which is the high-definition.

According to the micro-lens array substrate 74 of the above-described embodiment, the lens-shaped concave portion 6 is directly formed in the surface of the quartz substrate 2 by the transfer method based on the dry-etching and by filling this lens-shaped concave portion with the resin, the micro-lens array 8 in which the plurality of micro-lenses 11 are consecutively arrayed is formed directly in the surface of the quartz substrate 2. Since the micro-lens array 8 is directly formed in the surface of the quartz substrate in this structure, the micro-lens array substrate 74 having the precise micro-lens array 8 whose pattern size is accurate can be provided.

Further, the boundary portion between the adjacent micro-lenses 11 is formed in a state without a non-lens area. Specifically, since the lens-shaped concave portion 6 is formed in the quartz substrate 2, the boundary portion is formed as the acute vertex 18 without becoming blunt, and the boundary portion is also formed as the lens area. Accordingly, the micro-lens array substrate having a high focusing efficiency can be obtained.

Since the micro-lens array 8 is formed by using the multiple exposure method, the spherical shape or aspherical shape can be obtained as the lens curved surface thereof, and a micro-lens array substrate whose lens curved surface fits the purpose can be provided.

On the other hand, since the taper portion 21 having the inclination toward the surface of the substrate from the micro-lens 11 of the outermost circumference is provided in the portion of the quartz substrate 2 corresponding to the peripheral portion of the micro-lens array 8, shrinkage of the micro-lens array 8 and peripheral portion is reduced when the cover glass 10 is bonded and the resin is hardened after filling the resin 9, and the excellent micro-lens array substrate 1 can be formed without generating an air bubble and distortion. Since the air bubble is not generated, the micro-lens 11 in the outermost circumference of the micro-lens array 8 can also be used.

Since the alignment mark 7 for stepper is integrally provided together with the lens-shaped concave portion 6 in the quartz substrate 2, the alignment mark 7 having a high positional accuracy can be obtained. In addition, there is no need to form the alignment mark in a separate process, and a manufacturing process can be simplified.

Since the cover glass plate 10 having a required thin thickness is formed on the side of the surface where the micro-lens array 8 is formed and the black matrix 15 is formed at the position corresponding to the boundary portion of the adjacent micro-lenses 11 in the surface of this cover glass plate 10, the black matrix 15 is formed at the closest position to the micro-lens array 11. With such black matrix 15, when this micro-lens array substrate constitutes a liquid crystal panel and light is irradiated on the acute vertex of the boundary portion between the adjacent micro-lenses 11, and if a stray light component is generated, the stray light component can securely be prevented by the black matrix 15 from being incident on the TFT circuit side.

With the thin cover surface layer thickness d2 made into 5 μm or more and 30 μm or less and further the thin resin thickness d3 made into 1 μm or more and 5 μm or less, even when the micro-lens 11 becomes minute as the resolution becomes higher, light can be focused on an objective area. Specifically, the lens focal depth of the minute micro-lens 11 can be adjusted to the objective area. That is, a flexibility of an optical path design increases.

According to the method for manufacturing the micro-lens array substrate 74 of this embodiment, the lens-shaped concave portion 6 is formed by transferring the lens-shaped concave portion 4 of the resist layer 3b to the surface of the quartz substrate 2 by dry-etching, and this lens-shaped concave portion 6 is filled with the resin layer 9 to form the micro-lens array 8. The quartz substrate 2 itself does not shrink in contrast to the resin layer, and so the micro-lens array 8 whose pattern size is accurate can be formed. Further, since the lens-shaped concave portion 6 is transferred directly to the quartz substrate 2, the lens boundary portion between the adjacent micro-lenses 11 can be used as the lens area. Specifically, since the lens-shaped concave portion 6 does not cause a deformation such as becoming blunt in the boundary portion to the adjacent micro-lens, the micro-lens array 8 not having a non-lens area can be formed. Accordingly, the micro-lens array 8 having a high focusing efficiency can be formed.

With the multiple exposure method used for the exposure to form the lens-shaped concave portion 4 in the surface of the photo-resist layer 3a, the curved surface shape of the lens-shaped concave portion 4 can be controlled arbitrarily. Specifically, the lens curved surface and lens depth of the micro-lens array 8 can be designed freely and arbitrarily, and the lens-shaped concave portion 6 of a spherical shape or aspherical shape can be formed in the surface of the quartz substrate 2 in accordance with the purpose. Therefore, this manufacturing method is excellent in controlling the lens shape.

Since the taper portion 21 that continuously inclines toward the surface of the substrate from the lens-shaped concave portion 6 of the outermost circumference is formed on the surface of the quartz substrate 2 corresponding to the peripheral portion of the micro-lens array 8 by using the multiple exposure method and transfer, the shrinkage of the micro-lens array 8 and peripheral portion can be reduced when filling the resin 9 thereafter and the cover glass 10 is bonded and the resin is hardened, and the excellent micro-lens array substrate 74 can be formed without generating an air bubble and distortion. Since the air bubble is not generated, the micro-lens in the outermost circumference of the micro-lens array can also be used.

Since the alignment mark 7 for stepper is formed concurrently with the transferring of the lens-shaped concave portion 6 to the surface of the quartz substrate 2, the alignment mark 7 having a high positional accuracy can be formed, and the matching of a mask of the stepper apparatus can be performed accurately. Hence, the black matrix 15 can be formed precisely in the portion that corresponds to the boundary between the adjacent micro-lenses 11. In addition, since no separate process of forming the alignment mark is required, the process can be simplified.

Since the cover glass plate 10 having the thin cover surface layer thickness d2 of 5 μm or more and 30 μm or less and having the thin resin thickness d3 of 1 μm or more and 10 μm or less can be formed, the cover glass plate 10 can be made thinner in accordance with the focal depth when the micro-lens 11 is made minute as the resolution becomes higher, and the micro-lens array substrate 74 that copes with the high resolution can be manufactured.

In the micro-lens array substrate 74, the black matrix 15 is integrally formed in the surface of the cover glass plate 10 that is the closest to the micro-lens array 8. Further, the black matrix 15 is formed to correspond to the vertex 18 of the consecutive lens-shaped concave portion 6. Hence, when this micro-lens array substrate constitutes a liquid crystal panel and if a stray light component is generated by incident light on the acute vertex 18 of the boundary portion between the adjacent micro-lenses 11, the stray light component can securely be prevented from being incident on the TFT circuit side.

Since only one kind of resin layer 9 is used as the resin layer, the thermo-stability and light stability are excellent. Since the micro-lens array 8 is formed by filling the lens-shaped concave portion 6 of the quartz substrate 2 with the resin layer 9, the material to be used is reduced, also the number of processes becomes small, and the micro-lens array substrate 74 having a simple structure can be manufactured.

As shown in FIG. 18, in the method for manufacturing the micro-lens array substrate using the above-described conventional 2P method, since the lens shape is transferred to the resin layer 45 by the stamper 41, this manufacturing method is excellent in mass production. However, it is difficult to control the pattern size of the micro-lens array due to the thermal shrinkage of the resin layer 45 at the time of hardening. In addition, since the concave portion 46 is formed in the resin layer 45, an acute angle cannot be maintained but tends to become blunt in the boundary portion of the adjacent concave portions 46, that is, the vertex portion 53 (refer to FIG. 18), and as a result, the boundary portion becomes a non-lens area. Particularly, when the micro-lens itself is made minute in order to obtain higher resolution, a ratio of this non-lens area increases and it becomes difficult to form the micro-lens array. Also, there have been limits in thermostability and light stability since two kinds of resins are used. Furthermore, as shown in the above-described FIG. 17, in the method for manufacturing the micro-lens array substrate by using the wet etching method, since this method uses the isotropic etching, only the spherical shape can be obtained as the shape of the micro-lens, and a micro-lens of other aspheric shape may not be formed. That is, there is no controllability of the lens shape. On the other hand, there has been a limit of 30 μm in the past for the cover surface layer thickness, that is, the thickness from the resin layer of the vertex portion of the concave-shaped lens to the surface layer of the cover glass plate, and it has not been possible to obtain the thickness thinner than that. The reason is that it has not been possible to form a thin resin layer due to the influence of the viscosity of the resin at the time of forming the resin layer (in actuality, a resin whose viscosity is higher than 100 cp was used). On the other hand, it is possible to solve such problems in related-art as described above according to this embodiment.

Although the multiple exposure method is applied in the method for manufacturing the micro-lens array substrate according to the above-described embodiment, a gray mask method of performing the exposure by using what is called a gray mask in which the optical transmittance is changed from a center toward a periphery according to a lens shape in one piece of mask may be performed for the pattern exposure by means of the photolithography technology instead of the multiple exposure method.

Fifth Embodiment

Next, in FIGS. 8 and 9, a fifth embodiment of a micro-lens array substrate and method for manufacturing thereof according to the present invention is shown. This embodiment is also a case in which the present invention is applied to a micro-lens array substrate used for a liquid crystal panel constituting a liquid crystal projector.

Figure 8A:
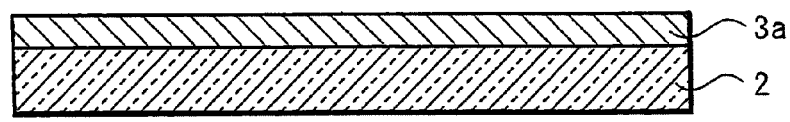
FIGS. 8A through 8D are (first) process diagrams showing a fifth embodiment of a method for manufacturing a micro-lens array substrate according to the present invention.
Figure 8B:
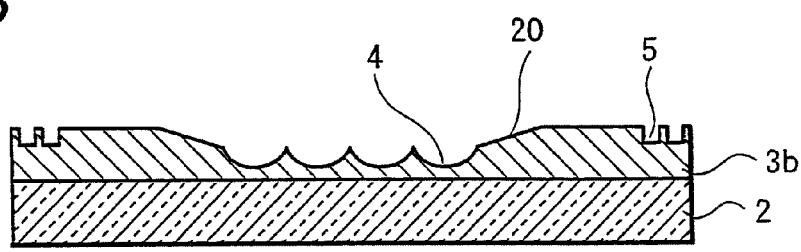
Figure 8C:
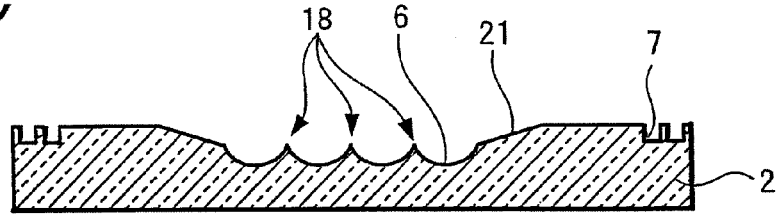

In this embodiment, since processes from FIGS. 8A to 8C are similar to the above-described processes from FIGS. 6A to 6C, a redundant explanation is omitted.

Figure 8D:
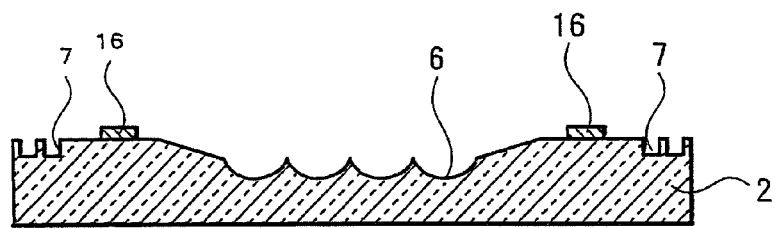

According to this embodiment, as shown in FIG. 8D, the alignment mark 16 for bonding a TFT substrate is formed on the surface of the quartz substrate 2 after the process of FIG. 8C. For example, similarly to the embodiment described above, an aluminum film for example is formed on the whole surface of the quartz substrate 2, and an opening is formed by selectively etching and removing the aluminum film at the portion corresponding to the alignment mark 7 for stepper. Subsequently, a positional alignment with an exposure mask of an i-line stepper apparatus is performed with the alignment mark 7 as a reference, and the aluminum film is selectively etched and patterned using the lithography technology to form the alignment mark 16.

Figure 9A:
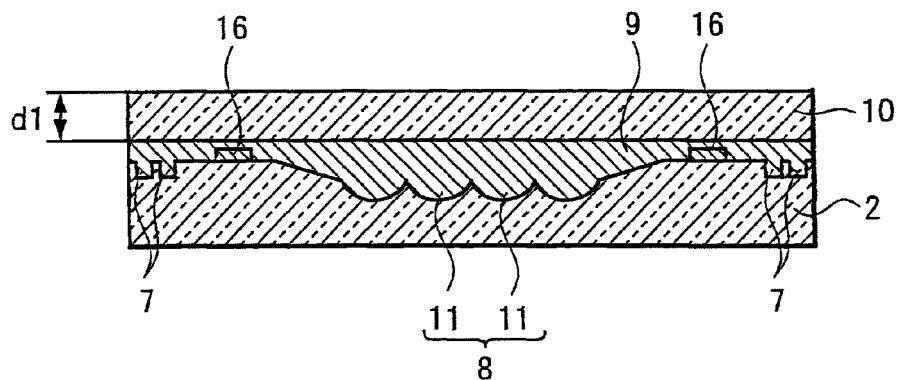
FIGS. 9A through 9C are (second) process diagrams showing the fifth embodiment of the method for manufacturing the micro-lens array substrate according to the present invention.

Next, as shown in FIG. 9A, the resin layer 9 whose refractive index is different from that of the quartz substrate 2 is formed on the surface of the quartz substrate 2 such that the lens-shaped concave portion 6, taper portion 21, and alignment mark 7 for stepper are filled with the resin layer, and the cover glass plate 10 of the parallel plate having the required thickness d1 is bonded to the resin layer 9 which is planarized. Similarly to the embodiment described above, a resin that has a larger refractive index than the refractive index of the quartz substrate 2 is here used as the resin layer 9. In this embodiment, in a state where the thermosetting resin 9, for example, is dripped and the cover glass plate 10 is placed on the surface of the quartz substrate 2, the lens-shaped concave portion 6 and alignment mark 7 are filled with the resin 9 by spin rotation. Thereafter, the cover glass plate 10 is bonded to the quartz substrate 2 by a thermosetting treatment. The micro-lens array 8 in which the plurality of micro-lenses 11 are consecutively arrayed is formed by the quartz substrate 2 and the lens-shaped concave portion 6 filled with resin layer 9. The consecutive micro-lenses 11 constituting this micro-lens array 8 are consecutive micro-lenses not having a non-lens area in the boundary portion of the adjacent micro-lenses 11. Concurrently, the alignment mark 7 in which the longitudinal grove pattern 5 is filled with the resin layer 9 is formed outside the micro-lens array area.

Figure 9B:
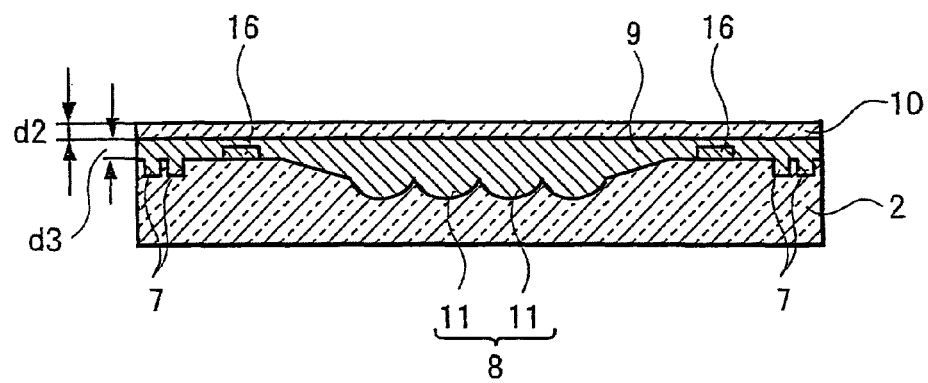

Next, as shown in FIG. 9B, by polishing the cover glass plate 10, the cover surface layer thickness d2 from the vertex of the micro-lens to the surface of the cover glass is made thin. Similarly to the embodiment described above, this cover surface layer thickness d2 can be made into 5 μm or more and 30 μm or less, preferably less than 20 μm, and more preferably 10 μm or less. In addition, the thickness d3 of the resin layer 9 can be made into 1 μm or more and 10 μm or less. The viscosity of the resin only needs to be 1 cp or more and 100 cp or less, and a resin having the viscosity of 30 cp is used in this embodiment.

Figure 9C:
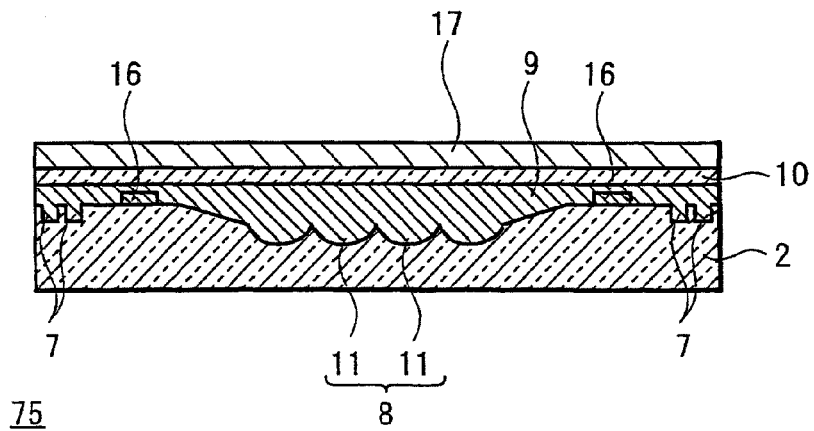

Next, as shown in FIG. 9C, a transparent conductive film that is the opposing electrode 17 made of the ITO (Indium Tin Oxide) film, for example, is formed on the cover glass plate 10, and an objective micro-lens array substrate 75 is obtained.

In the micro-lens array substrate 75 and method for manufacturing thereof according to this embodiment, other structure and manufacturing method are similar to the above-described micro-lens array substrate 74 than the fact that a black matrix is not formed on the cover glass plate 10. Accordingly, in the micro-lens array substrate 75 and method for manufacturing thereof according to this embodiment, a similar effectiveness to the above-described micro-lens array substrate 74 can be obtained except for the effectiveness of the black matrix.

Sixth Embodiment

Figure 10:
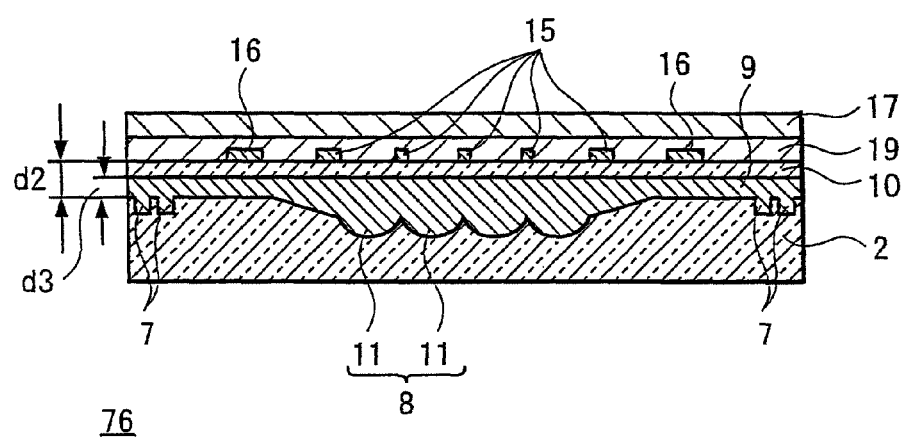
FIG. 10 is a cross-sectional diagram showing a sixth embodiment of a method for manufacturing a micro-lens array substrate according to the present invention.

A sixth embodiment of a micro-lens array substrate according to the present invention is shown in FIG. 10.

This embodiment is also a case in which the present invention is applied to a micro-lens array substrate used for a liquid crystal panel constituting a liquid crystal projector.

In this embodiment, since the processes from FIGS. 6A to 7C are the same as the above embodiment, a redundant explanation thereof is omitted.

In this embodiment, after the process of FIG. 7C, as shown in FIG. 10, a transparent protective layer that is the silicon oxide film ($SiO_2$ film) 19, for example, is formed on the cover glass plate 10 in which the black matrix 15 and alignment mark 16 are formed, and a transparent conductive film that is the opposing electrode 17 made of the ITO (Indium Tin Oxide) film, for example, is formed to be a further upper layer to obtain an objective micro-lens array substrate 76 of a parallel plate.

In the micro-lens array substrate 76 and method for manufacturing thereof according to this embodiment, other structure and manufacturing method are similar to the above-described micro-lens array substrate 74 than the fact that the silicon oxide film 19 is formed on the cover glass plate 10 in which the black matrix 15 and alignment mark 16 are formed. According to this embodiment, the oxidization of Al can be prevented by covering the black matrix 15 and alignment mark 16 made of Al, for example, with the silicon oxide film 19, and the black matrix 15 can be used for a long period of time. Further, since the silicon oxide film 19 that becomes the transparent protective layer acts as a anti-reflective film, the optical transmittance increases, and the light focusing efficiency can be improved. In addition, similar effectiveness to the above-described micro-lens array substrate 74 can be obtained also in the micro-lens array substrate and method for manufacturing thereof according to this embodiment.

Specific examples of the taper portion 21 that is formed in the quartz substrate or glass substrate of the micro-lens array substrate according to the present invention is shown in FIG. 11.

Figure 11A:
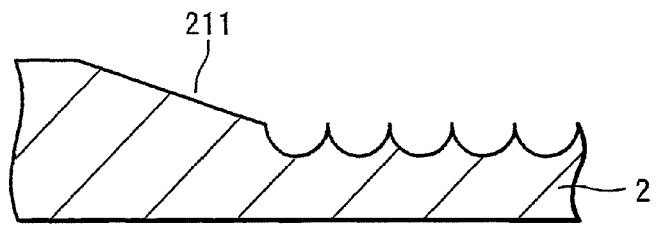
FIGS. 11A through 11D are cross-sectional diagrams of a relevant part showing each of specific examples of a taper portion.

A taper portion 211 shown in FIG. 11A is a gentle linear slope-shaped taper.

Figure 11B:
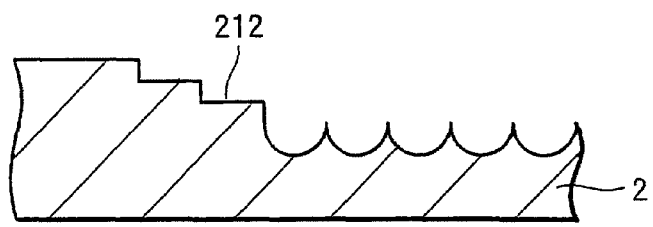

A taper portion 212 shown in FIG. 11B is a step-shaped taper toward the surface of the substrate. This step-shaped taper needs to be formed having the number of steps not to make an air bubble generated when the thermosetting is performed after a resin is filled.

Figure 11C:
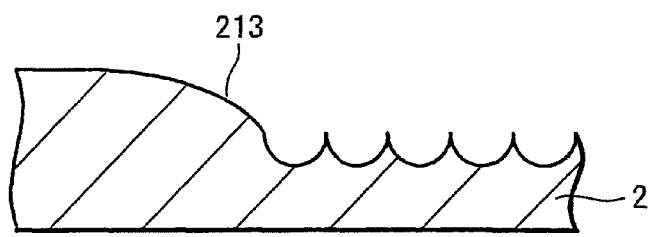

A taper portion 213 shown in FIG. 11C is an upward convex-shaped taper toward the surface of the substrate.

Figure 11D:
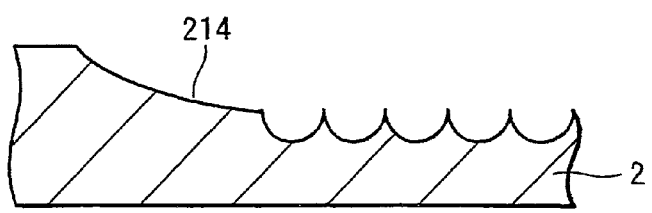

A taper portion 214 shown in FIG. 11D is a downward convex-shaped taper toward the surface of the substrate.

Since the shape of the taper portion only needs to be formed into a shape with which an air bubble is not generated by a thermal shrinkage at the time of thermosetting after a resin is filled, the shape is not necessarily limited to the above-described shapes.

Figures 15A, 15B:
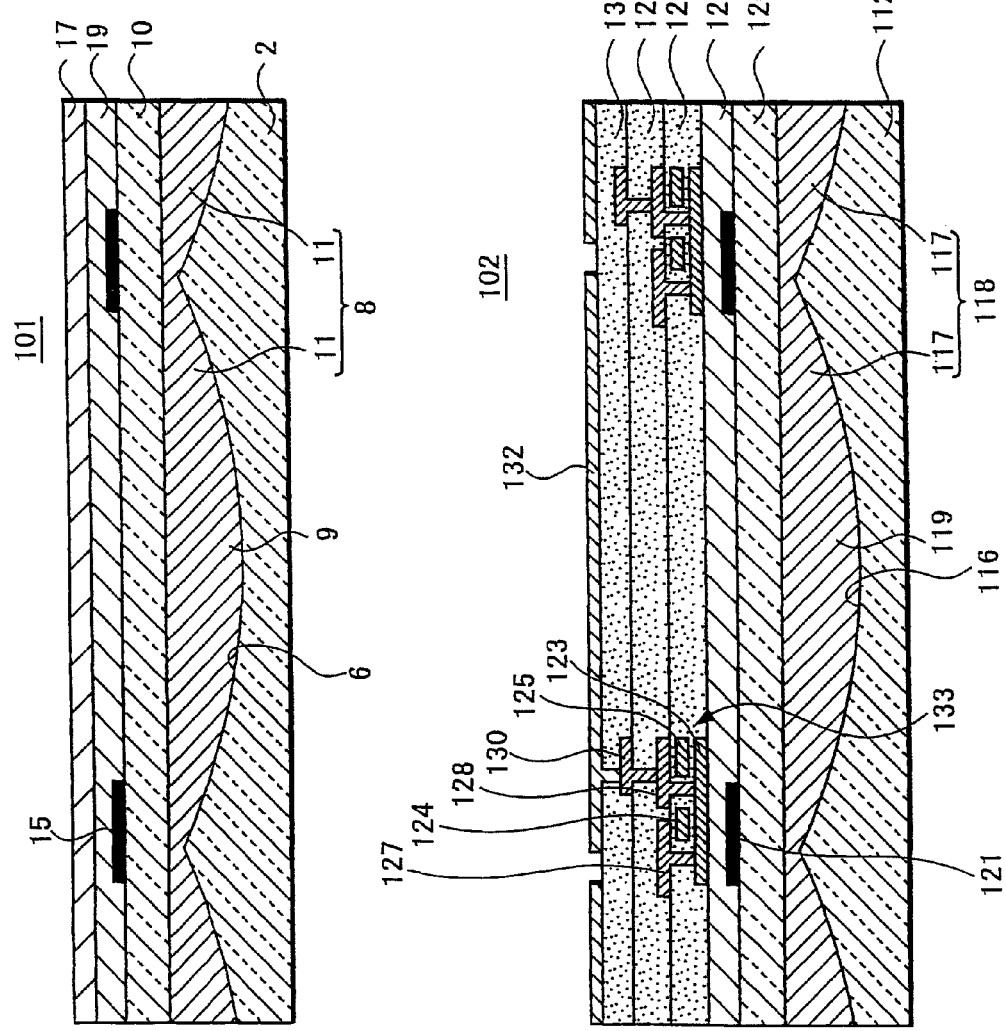
FIGS. 15A and 15B are (first) process diagrams showing an embodiment of a method for manufacturing a liquid crystal panel for liquid crystal projector manufactured by using the micro-lens array substrate according to the present invention.
Figure 16:
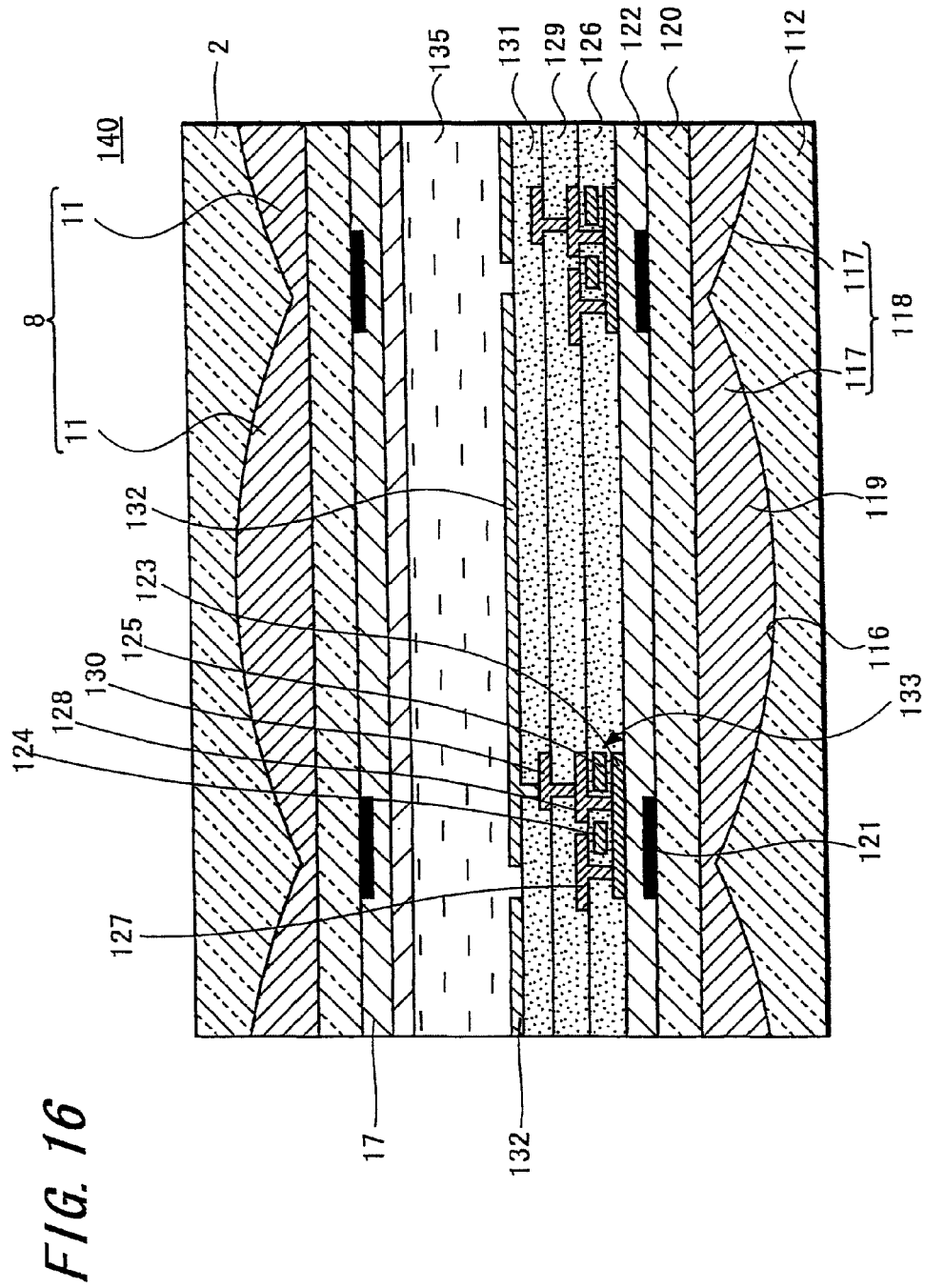
FIG. 16 is a (second) process diagram showing an embodiment of the method for manufacturing the liquid crystal panel for liquid crystal projector manufactured by using the micro-lens array substrate according to the present invention.
Figure 17A:
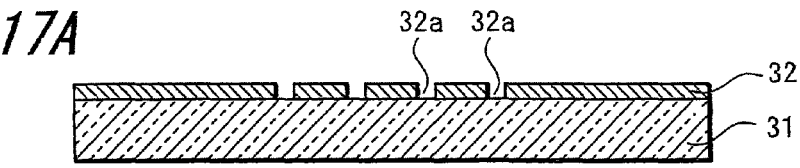
FIGS. 17A through 17D show a method for manufacturing a micro-lens array substrate using a wet etching method of related-art.
Figure 17B:
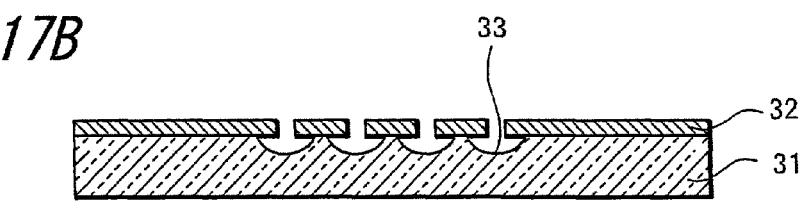
Figure 17C:
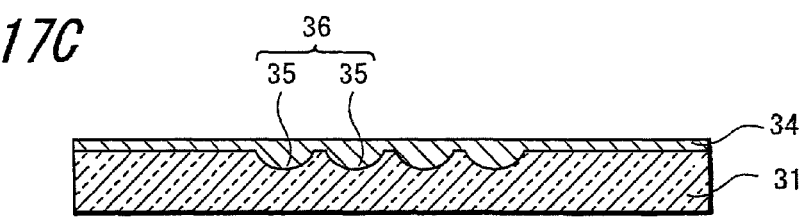
Figure 17D:
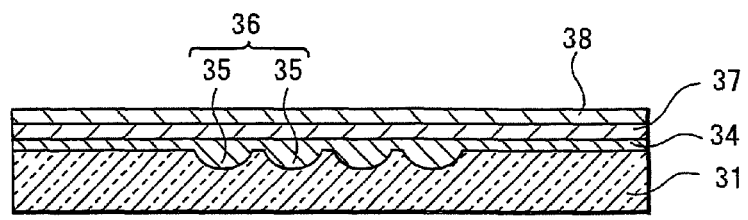
Figure 18A:
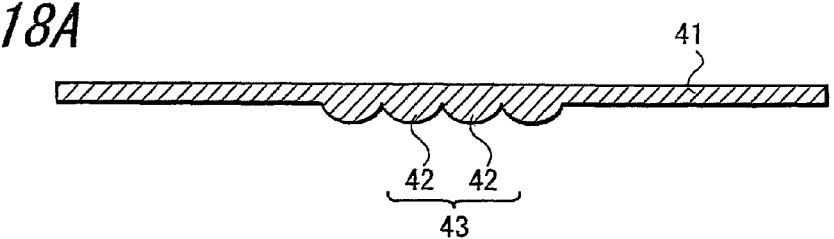
FIGS. 18A through 18E show a method for manufacturing a micro-lens array substrate using a 2P method of related art.
Figure 18B:
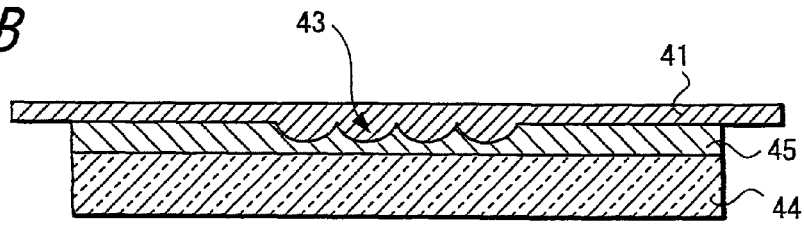
Figure 18C:
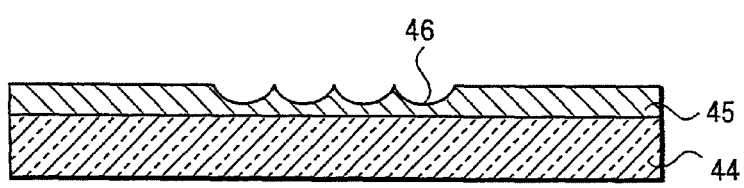
Figure 18D:
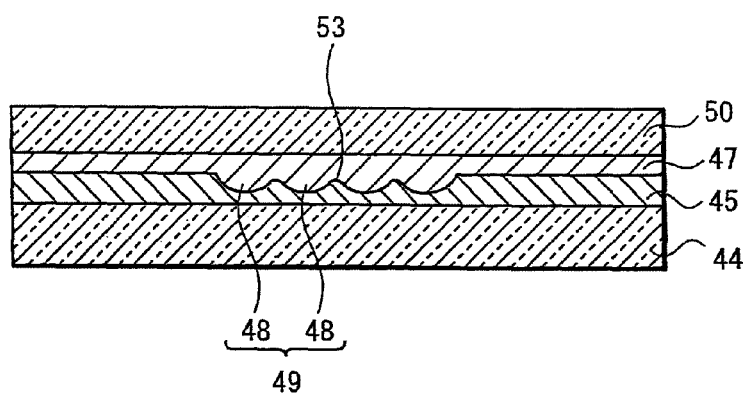
Figure 18E:
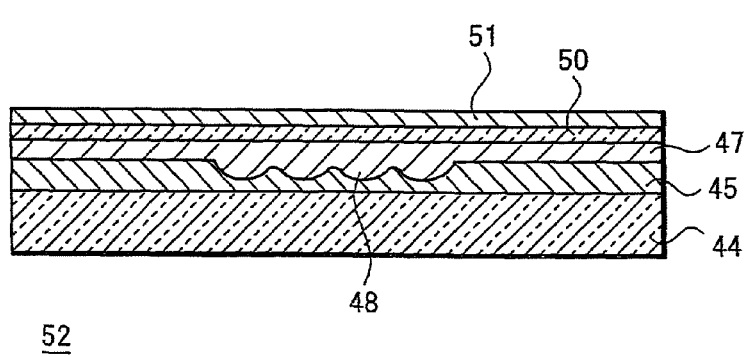
Figure 19:
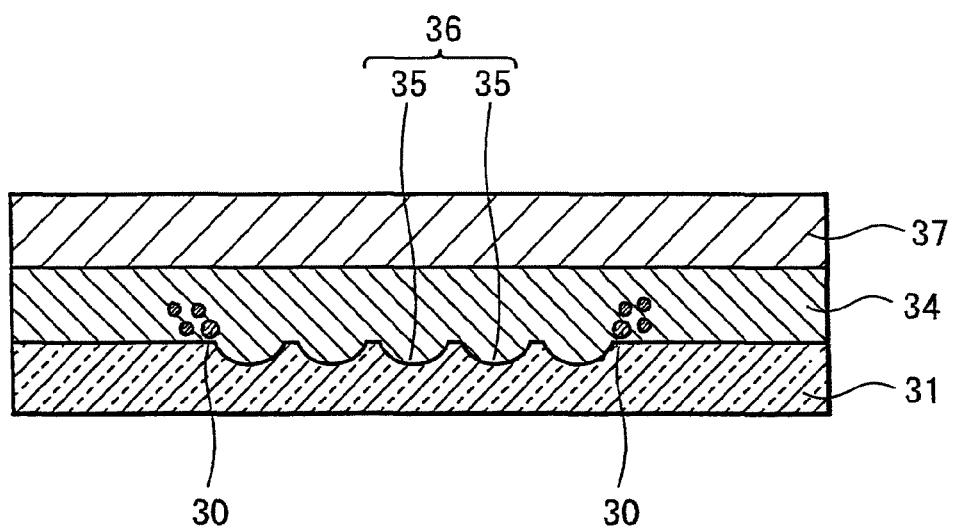
FIG. 19 is a cross-sectional diagram of a micro-lens array substrate of related art in which an air bubble is contained.

Next, a liquid crystal panel used for a liquid crystal projector that is manufactured by using the above-described micro-lens array substrate 72 of FIG. 5 or micro-lens array substrate 76 of FIG. 10 is explained by referring to FIGS. 15 and 16.

As shown in FIG. 15A, the above-described micro-lens array 72 obtained in FIG. 5 or the above-described micro-lens array 76 obtained in FIG. 10 is divided by a dividing line, which is not shown in the figure, and a micro-lens array substrate 101 corresponding to each liquid crystal panel is formed. Specifically, the micro-lens array substrate 101 is prepared such that the cover glass plate 10 is bonded to the quartz substrate 2 in which the micro-lens array 8 made of the plurality of consecutive micro-lenses 11 is formed by filling the lens-shaped concave portions 6 on the side of the surface with the resin layer 9, the lattice-shaped black matrix 15 is formed on the cover glass plate 10, and further the silicon oxide film 19 that is the transparent protective layer and the opposing electrode 17 are formed.

On the other hand, as shown in FIG. 15B, a TFT substrate 102 having a thin film transistor (TFT) and pixel electrode formed on a transparent substrate in which a micro-lens array is formed using a similar manufacturing method is formed. Specifically, by using similar processes to the above-described FIGS. 1A through 1E or by using similar processes to FIGS. 6A through 6E, a lens-shaped concave portion 116 is filled with a resin layer 119 whose refractive index is different from that of the quartz substrate 112 and a micro-lens array 118 is formed to have a plurality of consecutive micro-lenses 117 on a quartz substrate or glass substrate, for example, of a transparent substrate, which is a quartz substrate 112 in this embodiment. In addition, a cover glass plate 120 polished into a required thickness is bonded to the resin layer 119. A lattice-shaped black matrix 121 that becomes a light-shielding film similarly to the embodiment explained in the above-described FIG. 2C or FIG. 7C is formed on this cover glass plate 120 to enclose each micro-lens 117, specifically, along the periphery of each pixel area. Subsequently, after a silicon oxide film 122 of a transparent protective layer is formed on the cover glass plate 120 in a state in which this black matrix 121 is buried, the surface of an interlayer insulation film 126 is planarized by a CMP (Chemical Machinery Polishing) method, for example. Next, a semiconductor thin film 123 made of a polycrystalline silicon is selectively formed. After Si ions are injected into this semiconductor thin film 123 to be in an amorphous state, a thermal treatment is performed to form a polycrystalline by a solid-phase growth.

Next, an upper electrode 125 of a capacitor is formed on the semiconductor thin film 123 through the gate insulation film 124. Subsequently, after an interlayer insulation film 126 is formed, a signal wire 127 connected to one of source and drain regions of the semiconductor thin film 123 is formed and a lead wire 128 is formed in the other of the source and drain regions. Then, an interlayer insulation film 129 is formed, and a wiring pattern 130 connected to the lead wire 128 is formed. Further, an interlayer insulation film 131 is formed, and a pixel electrode 132 connected to the wiring pattern 130 of a lower layer is formed on this interlayer insulation film 131. Each of the above-described interlayer insulation films 126, 129, 131 can be formed of a silicon oxide film and the like, for example. Thus, the TFT substrate 102 provided with a thin film transistor (TFT) circuit 133 to drive the pixel electrode 132 is produced.

Further, as shown in FIG. 16, the micro-lens array substrate 101 and the TFT substrate 102 are aligned with the alignment mark 16 formed on the side of the above-described micro-lens array substrate 101 (refer to FIG. 2C, or FIG. 7C) as a reference, such that those substrates are disposed to face each other with a required space in between, and a liquid crystal 135 is injected and sealed in the space to produce a liquid crystal panel 140. This liquid crystal panel 140 is a liquid crystal panel of what is called a double micro-lens structure which has the micro-lens arrays 8 and 118 in both of the substrates 101 and 102. It should be noted that, although not shown in the figure, orientation films are formed in the surface of the opposing electrode 17 of the micro-lens array substrate 101 and in the surface on the side of the pixel electrode 132 of the TFT substrate 102, respectively.

According to this liquid crystal panel 140, since the respective micro-lens arrays 8 and 118 of the micro-lens array substrate 101 and the TFT substrate 102 are formed directly in the surfaces of the quartz substrates 2 and 112 by the transfer method based on dry-etching, this liquid crystal panel has precise micro-lens arrays with high accuracy. Further, since the lens-shaped concave portions are formed on the quartz substrates 2 and 112 by the transfer method, the boundary portion between the adjacent micro-lenses 11 and boundary portion between the adjacent micro-lenses, that is, respective vertex portions, are formed as lens areas without bluntness. In other words, the micro-lens arrays 8 and 118 without a non-lens area are formed. With those accurate micro-lens arrays 8 and 118, light can be focused efficiently on each pixel. In addition, since the black matrix 15 is formed at the position corresponding to the boundary portion of each micro-lens 11 on the side of the micro-lens array substrate 102, even if incident light is irradiated on the boundary portion that is an edge portion of the lens and a stray light component is generated, the stray light component is shielded by the black matrix 15 and can be prevented from being incident on the side of the TFT circuit 133. Hence, it is possible to prevent disadvantages with respect to a picture quality such as generation of optical leak current, flicker, and decrease of contrast.

When the micro-lens array substrate 76 of FIG. 10 is used, since the taper portion 21 is formed toward the surface of the substrate continually from the micro-lens 11 of the outermost circumference in the quartz substrate 2 of the micro-lens array substrate, an air bubble or distortion is not generated and the picture quality can be improved.

Since the liquid crystal panel 140 of this embodiment uses the above-described micro-lens array substrate 101 and since there is no non-lens area as the micro-lens array, the light focusing efficiency can be improved by efficiently functioning as the micro-lens array even when the micro-lens is made minute in order to make the resolution higher. In addition, with the cover surface layer thickness being 5 μm or more and 30 μm or less, and the thickness of the resin layer being 1 μm or more and 10 μm or less, which are thin, a minute micro-lens whose focal length is shortened can be formed. Accordingly, a liquid crystal panel used for a liquid crystal projector, which has a high resolution and high reliability, can be provided.

Although the micro-lens array substrate 72 or micro-lens array substrate 76 is used in the liquid crystal panel of the above embodiment, a liquid crystal panel using the micro-lens array substrate 1 of FIG. 2D or the micro-lens array substrate 74 of FIG. 7D can also be used as the structure thereof. Further, a liquid crystal panel using the micro-lens array substrate 71 of FIG. 4C or the micro-lens array substrate 75 of FIG. 9C can also be used as the structure thereof. In this case, a black matrix that becomes a light-shielding film to prevent light from being incident on the TFT circuit 133 is formed on the interlayer insulation film 129 in FIG. 16 with the wiring pattern 130 in between.

Moreover, a liquid crystal panel can be made by using as the TFT substrate a TFT substrate without the micro-lens array 118 and by combining the TFT substrate with the micro-lens array substrate of the present invention.

Although the micro-lens array substrate according to the present invention is applied to the liquid crystal panel in the above embodiment, this micro-lens array substrate can also be used for other display apparatuses than the above such as a plasma display panel (PDP), organic EL monitor, and field emission display (FPD) in order to improve a brightness or to expand a view angle with the refractive index or shape of the lens array being altered. Furthermore, the micro-lens array substrate of the present invention can be applied to a lighting apparatus.

The invention claimed is:

1. A method for manufacturing a micro-lens array substrate, comprising:
    forming a resist layer that has a plurality of consecutive lens-shaped concave portions on a surface of a substrate and a tapered portion of the resist layer corresponding to a peripheral portion of the plurality of consecutive lens-shaped concave portions is formed in a tapered shape inclined toward the surface of the substrate from the peripheral portion of the plurality of consecutive lens-shaped concave portions;
    dry-etching said resist layer to transfer said plurality of consecutive lens-shaped concave portions and said tapered portion into the surface of said substrate;
    forming a micro-lens array by injecting a resin whose refractive index is different from that of said substrate into the plurality of consecutive lens-shaped concave portions and said tapered portion in the surface of said substrate; and
    forming a cover glass member on the substrate with the resin interposed between the cover glass member and the substrate,
    wherein a viscosity of the resin is 1 cp or more and 100 cp or less.

2. The method for manufacturing a micro-lens array substrate according to claim 1, wherein the plurality of consecutive lens-shaped concave portions of said resist layer is consecutively formed in a state without a non-lens area between each of the plurality of consecutive lens-shaped concave portions by using a multiple exposure method.

3. The method for manufacturing a micro-lens array substrate according to claim 1, wherein a thickness of a cover surface layer from a vertex of said micro-lens array to a surface of said cover glass member is 30 μm or less.

4. The method for manufacturing a micro-lens array substrate according to claim 3, wherein a thickness of the resin layer is 10 μm or less.

5. The method for manufacturing a micro-lens array substrate according to claim 1, wherein a transparent protective layer including silicon oxide is formed on said cover glass member.

6. The method for manufacturing a micro-lens array substrate according to claim 5, wherein a transparent conductive film is formed on said transparent protective layer.

7. The method for manufacturing a micro-lens array substrate according to claim 5, wherein a black matrix is formed between said cover glass member and said transparent protective layer.

8. The method for manufacturing a micro-lens array substrate according to claim 3, wherein a thickness of a cover surface layer from a vertex of said micro-lens array to a surface of said cover glass member is 30 μm or less.

9. The method for manufacturing a micro-lens array substrate according to claim 8, wherein a thickness of the resin layer is 10 μm or less.

10. The method for manufacturing a micro-lens array substrate according to claim 3, wherein a transparent protective layer including silicon oxide is formed on said cover glass member.

11. The method for manufacturing a micro-lens array substrate according to claim 10, wherein a transparent conductive film is formed on said transparent protective layer.

12. The method for manufacturing a micro-lens array substrate according to claim 10, wherein a black matrix is formed between said cover glass member and said transparent protective layer.

13. A method for manufacturing a micro-lens array substrate, comprising:
    forming a resist layer that has a plurality of consecutive lens-shaped concave portions on a surface of a substrate and a tapered portion of the resist layer corresponding to a peripheral portion of the plurality of consecutive lens-shaped concave portions is formed in a tapered shape inclined toward the surface of the substrate from the peripheral portion of the plurality of consecutive lens-shaped concave portions;
    dry-etching said resist layer to transfer said plurality of consecutive lens-shaped concave portions and said tapered portion into the surface of said substrate;
    forming a micro-lens array by injecting a resin whose refractive index is different from that of said substrate into the plurality of consecutive lens-shaped concave portions and said tapered portion in the surface of said substrate and by bonding a cover glass member; and
    polishing said cover glass member into a required thickness,
    wherein a viscosity of the resin is 1 cp or more and 100 cp or less.

14. The method for manufacturing a micro-lens array substrate according to claim 13, wherein the plurality of consecutive lens-shaped concave portions of said resist layer is consecutively formed in a state without a non-lens area between each of the plurality of consecutive lens-shaped concave portions by using a multiple exposure method.

15. The method for manufacturing a micro-lens array substrate according to claim 13, further comprising:
   forming a light-shielding layer in a surface of said cover glass member at a position corresponding to a boundary portion between adjacent micro-lenses of the micro-lens array.

16. A micro-lens array substrate, comprising:
   a micro-lens array that has a plurality of consecutive concave lens-shaped concave portions formed in a surface of a substrate, the lens-shaped concave portions being filled with a resin;
   a portion of the substrate corresponding to a peripheral portion of the micro-lens array is formed in a tapered shape inclined toward the surface of the substrate from the peripheral portion of the micro-lens array; and
   a cover glass member is formed on the substrate with the resin interposed between the cover glass member and the substrate,
   wherein a viscosity of the resin is 1 cp or more and 100 cp or less.

17. The micro-lens array substrate according to claim 16, wherein a thickness of a cover surface layer from a vertex of said micro-lens array to a surface of said cover glass member is 30 μm or less.

18. The micro-lens array substrate according to claim 17, wherein a thickness of the resin layer is 10 μm or less.

19. The micro-lens array substrate according to claim 16, wherein a transparent protective layer including silicon oxide is formed on said cover glass member.

20. The micro-lens array substrate according to claim 19, wherein a transparent conductive film is formed on said transparent protective layer.

21. The micro-lens array substrate according to claim 19, wherein a black matrix is formed between said cover glass member and said transparent protective layer.

22. A liquid crystal panel, comprising:
   the micro-lens array substrate according to claim 16.

23. A liquid crystal projector, comprising:
   the micro-lens array substrate according to claim 16.

24. A display, comprising:
   the micro-lens array substrate according to claim 16.

25. A lighting apparatus, comprising:
   the micro-lens array substrate according to claim 16.

26. A TFT (thin film transistor), comprising:
   the micro-lens array substrate according to claim 19, wherein
   a TFT circuit is formed on the transparent protective layer, and
   a pixel electrode is electrically connected to the TFT circuit.

* * * * *